United States Patent
Iino et al.

(10) Patent No.: US 6,697,071 B2
(45) Date of Patent: Feb. 24, 2004

(54) METHOD, GAME MACHINE AND RECORDING MEDIUM FOR DISPLAYING MOTION IN A VIDEO GAME

(75) Inventors: Kazuhiko Iino, Saitama (JP); Tomoaki Yoshinobu, Hyogo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 295 days.

(21) Appl. No.: 09/769,435

(22) Filed: Jan. 26, 2001

(65) Prior Publication Data

US 2002/0050997 A1 May 2, 2002

(30) Foreign Application Priority Data

Jan. 28, 2000 (JP) ........................................ 2000-020949
Jan. 22, 2001 (JP) ........................................ 2001-013882

(51) Int. Cl.$^7$ ............................................. G06T 15/70
(52) U.S. Cl. ............................ 345/474; 345/473; 463/1
(58) Field of Search ................................ 345/419, 473, 345/474; 463/1

(56) References Cited

U.S. PATENT DOCUMENTS 6,088,042 A * 7/2000 Handelman et al. ........ 345/473
6,203,425 B1 * 3/2001 Hayashi ........................ 463/1

FOREIGN PATENT DOCUMENTS

JP         9-218961        8/1997

OTHER PUBLICATIONS

English Language Abstract of JP 9-218961.

* cited by examiner

Primary Examiner—Mark Zimmerman
Assistant Examiner—Kimbinh T. Nguyen
(74) Attorney, Agent, or Firm—Greenblum & Bernstein, P.L.C.

(57) ABSTRACT

A method, game machine, computer program and a recording medium include displaying a final motion image sequence of a character in a video game according to motion data defining variations in posture of the character. The method includes responding to an input operation of a game player, performed during display of first motion data defining a first motion image sequence of the character, and determining second motion data defining a second motion image sequence of the character. A transitional motion image sequence is created based on a single posture defined in the first motion data and a group of postures defined in the second motion data. The final motion image sequence is displayed, which includes a portion of the first motion image sequence, the transitional motion image sequence, and a portion of the second motion image sequence, creating a gradual transition of motion image sequences.

34 Claims, 19 Drawing Sheets

METHOD, GAME MACHINE AND RECORDING MEDIUM FOR DISPLAYING MOTION IN A VIDEO GAME

The present disclosure relates to subject matter contained in priority Japanese Patent Application Nos. 2000-020949, filed on Jan. 28, 2000, and 2001-13882, filed on Jan. 22, 2001, the disclosures of which are expressly incorporated herein by reference in their entireties.

BACKGROUND OF THE INVENTION

1. Field of the Invention

The present invention relates to video games. More particularly, the present invention relates to displaying motion of a virtual object, known as a character, on a screen of a game machine.

2. Description of the Related Art

In recent years, so-called 3D games have become widespread. That is, three-dimensional virtual objects, known as characters, which are made up of polygons are positioned in a virtual 3D space. An image that is viewed from a desired point of view is created and displayed on screen.

A series of motions of a character in a video game is also known as motion. This motion is displayed according to motion data previously stored in memory. The motion data consists of data for specifying a series of postures of a character when its hands and legs are varied. Displaying the motion of a character on a display device is also referred to as reproducing the motion.

When some motion of a character in a game is being displayed, if the motion of the character is varied in response to an input operation of a game player, motion data about modified motion is read from the memory, and the modified motion is displayed according to the motion data read out. However, if a simple transition of the motion is made in this way, the image of the character varies frequently and suddenly when the transition is started. This is undesirable for the game player.

A known method for making a smooth motion transition consists of blending the original motion and the motion that the game player wants to gain. For example, in the technique disclosed in Japanese Patent Laid-Open No. 218961/1997, information for specifying a posture is created every frame from data about the original posture (source posture) and from data about the posture (target posture) that the player wants to gain. Information for specifying the two postures is interpolated every frame. The posture is created every frame. At this time, interpolation ratios are weighted. Weights given to the data about the target motion are gradually increased. In this way, motion data permitting a smooth transition to the target motion is created.

The aforementioned method for making a transition to the desired motion by blending can be applied to only cases where two motions resemble to some extent. For example, in the technique disclosed in the above-cited Japanese Patent Laid-Open No. 218961/1997, a walking motion and a running motion that are similar to each other are morphed. If these motions proceed in the same direction, interpolation between these two kinds of motions is permitted for every posture.

In a sports game, such as a baseball game, the source motion and the target motion (also known as destination motion) are not always alike. For example, the game player's instruction may be switched from "running to the right" to "running to the left". The rightward and leftward motions are entirely opposite in character's orientation. In running to the right, the hands and legs are moved to go to the right. In running to the left, the hands and legs are moved to go to the left. In this case, if information for specifying the posture at each frame is interpolated, motions of hands and legs are not constant in transitional motions that link together these two kinds of motions, resulting in unnatural motions.

SUMMARY OF THE INVENTION

Accordingly, it is an object of the present invention to provide a method of displaying a motion image sequence in such a way that a smooth transition to a target motion image sequence can be made if source motion and target motion are opposite in direction.

It is another object of the invention to provide a game machine using the method described in the immediately preceding paragraph.

It is a further object of the invention to provide a recording medium for use in the game machine described in the immediately preceding paragraph.

An aspect of the present invention provides a method of displaying a final motion image sequence of a character in a video game according to motion data defining variations in posture of the character in the video game. The method includes responding to an input operation of a game player that is performed during display of a first motion image sequence based on first motion data of the character and determining, in response to the input operation, second motion data defining a second motion image sequence of the character. A transitional motion image sequence is created based on a single posture defined in the first motion data and a group of postures defined in the second motion data. The final motion image sequence is displayed, including a portion of the first motion image sequence, the transitional motion image sequence, and a portion of the second motion image sequence.

According to an aspect of the invention, the transitional motion image sequence creates a gradual transition from the single posture defined in the first motion data to the group of postures defined in the second motion data. Also, the single posture defined in the first motion data is a posture being displayed when the input operation is performed by the game player. The transitional motion image sequence of the character may be displayed subsequently to the single posture defined in the first motion data.

The second motion image sequence defined by the second motion data includes an initial posture defined by the second motion data and at least one subsequent posture defined by the second motion data after the initial posture. Also, successive postures of the second motion image sequence defined by the second motion data are successively superimposed on the single posture defined by the first motion data, and transitional postures based on the superimposed postures are placed in a row to create transitional motion data defining the transitional motion image sequence. Or, successive postures of the second motion image sequence defined by the second motion data may be successively combined with the single posture defined in the first motion data, and transitional postures are placed in a row to create transitional motion data defining the transitional motion image sequence.

A second aspect of the present invention provides a method of displaying a final motion image sequence of a character in a video game according to motion data defining a posture of the character at each image frame of the video game. The method includes receiving an input operation of a game player that is performed during display of a first motion image sequence based on first motion data of the character and determining second motion data defining a second motion image sequence of the character. Transitional motion data is created based on a posture of the character displayed in the image frame when the input operation is performed and on a sequence of image postures defined by the determined second motion data. Then, the final motion image sequence is displayed based on the posture of the character displayed in the image frame when the input operation is performed, the transitional motion data, and the second motion data following the sequence of image postures.

A third aspect of the present invention provides method of displaying a final motion image sequence of a character in a video game according to motion data defining variations in posture of the character in the video game. The method includes responding to an input operation of a game player that is performed during display of a first motion image sequence based on first motion data of the character, determining, in response to the input operation, second motion data defining a target motion image sequence of the character and deciding whether the first motion data is motion data created by a combination of plurality of motion data element sets. If the first motion data is not created by the combination of motion data element sets, transitional motion data is created based on a first posture image sequence defined in the first motion data and a second motion image sequence defined in the second motion data. If the first motion data is created by the combination of motion data element sets, transitional motion data is created based on a single posture defined in the first motion data and a third motion image sequence defined in the second motion data. A final motion image sequence is displayed based on the transitional motion data and one of the second motion sequence and the third motion sequence following one of the first motion sequence and the single posture defined in the first motion data, respectively.

A fourth aspect of the present invention provides a game machine including a computer-readable recording medium on which a program for displaying a motion image sequence of a character in a video game according to motion data defining variations in posture of the character in the video game is recorded, a computer for reading at least a part of the program from the recording medium and executing it, and a display device on which the video game realized by the program is displayed. The computer responds to an input operation of a game player during display of a first motion image sequence of the character based on first motion data, determines second motion data defining a second motion image sequence of the character, and creates transitional motion data defining a transitional motion image sequence based on a single posture defined in the first motion data and a group of postures defined in the second motion data. A final motion image sequence is displayed based on a portion of the first motion image sequence, the transitional motion image sequence, and a portion of the second motion image sequence.

A fifth aspect of the invention provides a game machine, including a computer-readable recording medium on which a program for displaying a final motion image sequence of a character in a video game according to motion data defining a posture of the character at each image frame of the video game is recorded. The game machine also includes a computer for reading at least a part of the program from the recording medium and executing it, and a display device on which the video game realized by the program is displayed. The computer responds to an input operation of a game player that is performed during display of a first motion image sequence based on first motion data of the character, determines second motion data defining a second motion image sequence of the character and creates transitional motion data based on a posture of the character displayed in the image frame when the input operation is performed and on a sequence of image postures defined by the determined second motion data. The final motion image sequence is displayed based on the posture of the character displayed in the image frame when the input operation is performed, the transitional motion data, and the second motion data following the sequence of image postures.

A sixth aspect of the present invention provides a game machine that includes a computer-readable recording medium on which a program for displaying a final motion image sequence of a character in a video game according to motion data defining variations in posture of the character in the video game is recorded, a computer for reading at least a part of the program from the recording medium and executing it, and a display device on which the video game realized by the program is displayed. The computer responds to an input operation of a game player that is performed during display of a first motion image sequence based on first motion data of the character and determines, in response to the input operation, second motion data defining a target motion image sequence of the character. The computer further decides whether the first motion data is motion data created by a combination of plurality of motion data element sets. If the first motion data is not created by the combination of motion data element sets, transitional motion data is created based on a first posture image sequence defined in the first motion data and a second motion image sequence defined in the second motion data. If the first motion data is created by the combination of motion data element sets, transitional motion data is created based on a single posture defined in the first motion data and a third motion image sequence defined in the second motion data. The final motion image sequence is displayed based on the transitional motion data and one of the second motion sequence and the third motion sequence following one of the first motion sequence and the single posture defined in the first motion data, respectively.

A seventh aspect of the present invention provides a recording medium for recording a program for displaying a final motion image sequence of a character in a video game according to motion data defining variations in posture of the character in the video game, the recording medium being readable by a computer. The program causes the computer to respond to an input operation of a game player that is performed during display of a first motion image sequence based on first motion data of the character and determine, in response to the input operation, second motion data defining a second motion image sequence of the character. The computer creates transitional motion data defining a transitional motion image sequence based on a single posture defined in the first motion data and a group of postures defined in the second motion data and displays the final motion image sequence comprising a portion of the first motion image sequence, the transitional motion image sequence, and a portion of the second motion image sequence.

An eighth aspect of the present invention provides a recording medium for recording a program for displaying a final motion image sequence of a character in a video game according to motion data defining a posture of the character in the video game at each image frame of the video game, the recording medium being readable by a computer. The program causes the computer to respond to an input operation of a game player that is performed during display of a first motion image sequence based on first motion data of the character, determine second motion data defining a second motion image sequence of the character, and create transitional motion data based on a posture of the character displayed in the image frame when the input operation is performed and on a sequence of image postures defined by the determined second motion data. The final motion image sequence is displayed based on the posture of the character displayed in the image frame when the input operation is performed, the transitional motion data, and the second motion data following the sequence of image postures.

A ninth aspect of the invention provides a recording medium for recording a program for displaying a final motion image sequence of a character in a video game according to motion data defining variations in posture of the character in the video game, the recording medium being readable by a computer. The program causes the computer to respond to an input operation of a game player that is performed during display of a first motion image sequence based on first motion data of the character and determines, in response to the input operation, second motion data defining a target motion image sequence of the character. The program further causes the computer to decide whether the first motion data is motion data created by a combination of plurality of motion data element sets. If the first motion data is not created by the combination of motion data element sets, transitional motion data is created based on a first posture image sequence defined in the first motion data and a second motion image sequence defined in the second motion data. If the first motion data is created by the combination of motion data element sets, transitional motion data is created based on a single posture defined in the first motion data and a third motion image sequence defined in the second motion data. The final motion image sequence is displayed based on the transitional motion data and one of the second motion sequence and the third motion sequence following one of the first motion sequence and the single posture defined in the first motion data, respectively.

A tenth aspect of the present invention provides a program for use with a computer to display a final motion image sequence of a character in a video game according to motion data defining variations in posture of the character in the video game. The program causes the computer to respond to an input operation of a game player that is performed during display of a first motion image sequence based on first motion data of the character and determine, in response to the input operation, second motion data defining a second motion image sequence of the character. The program further causes the computer to create transitional motion data defining a transitional motion image sequence based on a single posture defined in the first motion data and a group of postures defined in the second motion data. The final motion image sequence is displayed, the final motion image sequence including a portion of the first motion image sequence, the transitional motion image sequence, and a portion of the second motion image sequence.

An eleventh aspect of the present invention provides a program recorded on a recording medium for use with a computer to display a final motion image sequence of a character in a video game according to motion data defining a posture of the character at each image frame of the video game. The program causes the computer to read at least a part of the program from the recording medium, to respond to an input operation of a game player that is performed during display of a first motion image sequence based on first motion data of the character and determine second motion data defining a second motion image sequence of the character. Transitional motion data is created based on a posture of the character displayed in the image frame when the input operation is performed and on a sequence of image postures defined by the determined second motion data. The final motion image sequence is displayed based on the posture of the character displayed in the image frame when the input operation is performed, the transitional motion data, and the second motion data following the sequence of image postures.

A twelfth aspect of the invention provides a program for use with a computer to display a final motion image sequence of a character in a video game according to motion data defining variations in posture of the character in the video game. The program causes the computer to respond to an input operation of a game player that is performed during display of a first motion image sequence based on first motion data of the character and determines, in response to the input operation, second motion data defining a target motion image sequence of the character. The program further causes the computer to decide whether the first motion data is motion data created by a combination of plurality of motion data element sets. If the first motion data is not created by the combination of motion data element sets, transitional motion data is created based on a first posture image sequence defined in the first motion data and a second motion image sequence defined in the second motion data. If the first motion data is created by the combination of motion data element sets, transitional motion data is created based on a single posture defined in the first motion data and a third motion image sequence defined in the second motion data. The final motion image sequence is displayed based on the transitional motion data and one of the second motion sequence and the third motion sequence following one of the first motion sequence and the single posture defined in the first motion data, respectively.

Other objects and aspects of the invention will appear in the course of the following description.

DESCRIPTION OF THE PREFERRED EMBODIMENTS

Figure 1:
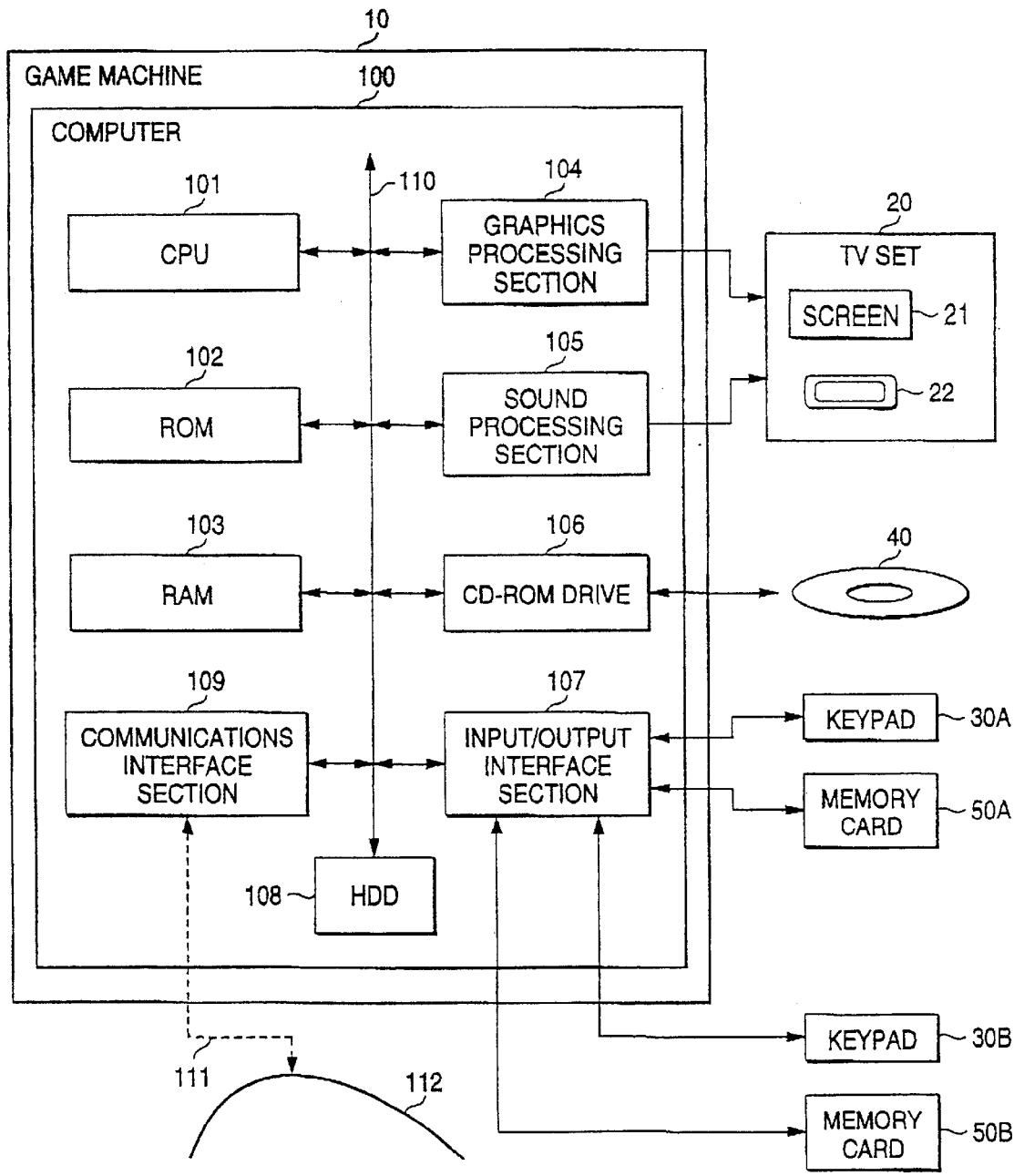
FIG. 1 is a conceptual block diagram of a game system using a game machine incorporating a computer in accordance with an aspect of the present invention.

Some embodiments of a recording medium, a motion displaying method, and a game machine in accordance with the present invention are hereinafter described with reference to the accompanying drawings. In the following description, like components are indicated by like reference numerals. Note that descriptions of the second and following embodiments focus on the differences with the first embodiment.

First Embodiment

Referring to FIG. 1, a game system is generally indicated by reference numeral 1 and comprises a game machine 10, a TV set 20, and keypads 30A, 30B. The TV set 20 and the keypads 30A, 30B are connected with the game machine 10 via cables. The keypads 30A and 30B permit two persons to manipulate them. A CD-ROM 40 on which a computer program in accordance with the present invention, is recorded, for example, is removably inserted in the game machine 10. This game machine 10 is a game machine for domestic use and includes a computer 100 enclosed within a casing.

A game player depresses an access button (not shown) on top of the game machine 10 to open a cover (not shown) that can be opened and closed. Then, the game player inserts the CD-ROM 40, for example, into the machine. The game machine 10 executes a computer game program recorded on the CD-ROM 40.

The present game machine 10 has a pair of card slots (not shown) corresponding to the keypads 30A, 30B. Two memory cards 50A, 50B that are external auxiliary recording media can be inserted into the card slots, respectively. Each game player can record data about a character within a game or data necessary to resume the game (e.g., data regarding the progress of the game program) on the memory card 50A or 50B at will, the card 50A or SOB being inserted in one of the card slots. If the player interrupts the game and then he or she again executes the game using the memory card 50A or 50B, the game machine 10 resumes the game from the interrupted portion.

The TV set 20 is used as one example of a display device for the game machine 10. The TV set 20 receives a video signal and an audio signal from the game machine 10, processes the received video signal, displays the resulting image on its screen 21, and produces speech corresponding to the received audio signal from a loudspeaker or loudspeakers 22 ancillary to the TV set 20.

Generally, the keypads 30A and 30B are also known as controllers and have multiple buttons and other control portions which are manipulated by game players. They are used as examples of input devices. An example of the structure of the keypads will be described later.

The computer 100 comprises a central processing unit (CPU) 101, a read-only memory (ROM) 102, a random-access memory (RAM) 103 forming a main memory in which a game program to be used and data used by the game program are temporarily stored, a graphics processing portion 104, a sound processing portion 105, a CD-ROM drive 106 in which the CD-ROM 40 is accepted, an input/output (I/O) interface portion 107, a magnetic storage device (such as a hard disk drive) 108, a communications interface portion 109, and a bus 110 connecting these components. An instruction stream necessary for the CPU 101 to execute program instructions is stored in the ROM 102. Also, data is stored in the ROM 102.

The CPU 101 decodes and executes the program instructions stored in the RAM 103 and controls the various components within the computer in accordance with the instructions. A game player's input operation on the keypad 30A or 30B is sent to the CPU 101 via the input/output interface portion 107. In response to this input operation, the CPU 101 controls the execution of the game program such that program portions corresponding to the input operation are carried out. The CPU 101 appropriately executes an instruction stream stored in the ROM 102 during execution of the program instructions.

The graphics processing portion 104 includes a video REM (VRAM) (not shown) containing two frame buffers (not shown). In response to an instruction given from the CPU 101, an image consisting of polygons representing an object is drawn on the frame buffer. The graphics processing portion 104 creates a video signal (e.g., TV signal) corresponding to the image stored in the frame buffer and sends it to a video circuit (not shown) in the TV set 20.

Two frame buffers are used for double buffering. Object images forming the same frame image are stored in one of the two frame buffers. When the creation of one frame image ends, the next frame image is stored in the other frame buffer. In this way, frame images are stored in the two frame buffers alternately.

The present frame image is stored in one of the two frame buffers. The recently stored frame image is read from the other frame buffer. The switching of the frame buffer to be read is synchronized with the vertical synchronizing signal in the TV set 20. Creation of an additional frame image is also synchronized with this vertical synchronizing signal. The period of the vertical synchronizing signal is the period of display of frame images. This period is also simply referred to as the frame period.

The sound processing portion 105 generates a sound signal representing speech, music, effect sound, or the like based on the sound data stored in the RAM 103. The sound signal is supplied to the loudspeaker 22 via an audio circuit (not shown) within the TV set 20.

The input/output interface portion 107 is connected with the keypads 30A, 30B and with the memory cards 50A, 50B inserted in the card slots (not shown). The input/output interface portion 107 controls the timing of transfer of data among these keypads, memory cards, CPU 101, and other circuits. Obviously, the computer constituting the game machine in accordance with the invention is not limited to the type shown or the like.

The CD-ROM 40 is a recording medium on which game programs and data used by the programs are recorded. The CD-ROM drive 106 reads in the game programs and data and loads them in the RAM 103. They are used by the CPU 101 during execution of such games.

The game programs and data used by the present game machine can be offered by other methods. For example, the game programs may be carried by a carrier wave used in communications, sent as computer data signals to be handled by the computer, and received by the game machine.

In particular, game programs may be downloaded from other devices (not shown) on a network 112 connected via a communications line 111 by the communications interface portion 109, and the programs may be used in the game machine 10. The magnetic storage device 108 can be used to store such downloaded game programs and to cause the CPU 101 to run the game programs or use them for other applications.

Alternatively, the aforementioned game programs and data may be previously stored in a memory within other devices (not shown) on the network 112 connected via the communications line 111. As the need arises, the programs and data are loaded into the RAM 103 in turn via the communications line 111 and the network 112. The game machine 10 may be so constructed that it supports only one network usage and a second usage consisting of using a CD-ROM or magnetic storage device 108.

Figure 2:
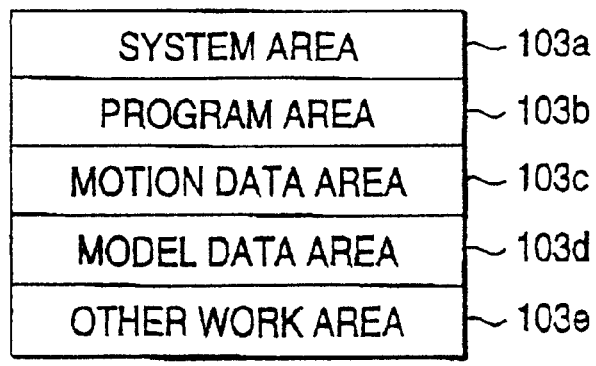
FIG. 2 is a diagram illustrating a memory map in a RAM incorporated in the computer shown in FIG. 1.

In the present embodiment, a baseball game is used as a game program. When a program for a baseball game is executed, the RAM 103 is used according to a memory map, for example, as shown in FIG. 2. A system information necessary for the fundamental operation for the progress of a game such as interrupt vectors indicating the destinations of jumps in an interrupt processing routine is stored in a system area 103*a*. Those portions of the game program which are being executed are loaded into a program area 103*b* from the CD-ROM 40.

Motion data indicating various motions of all baseball players are stored in a motion data area 103*c*. Model data about baseball players appearing within a baseball game are stored in a model data area 103*d*. The model data are used to create images representing these baseball players appearing in the game. These various kinds of data are loaded onto a corresponding working area from the CD-ROM 40 before execution of the game program. These various kinds of data will be described in detail later. Other working area 103*e* is used as a working area for temporarily storing other data during execution of the game program.

Motion data defines variations of the posture of each character representing a baseball player. Motion of the character is displayed by varying the posture that is displayed in accordance with the definitions of motion data. In the present embodiment, the posture of the character is defined for each frame. Data indicating a posture image sequence defined by the motion data is hereinafter referred to as a string of posture data or simply as posture data.

Figure 3:
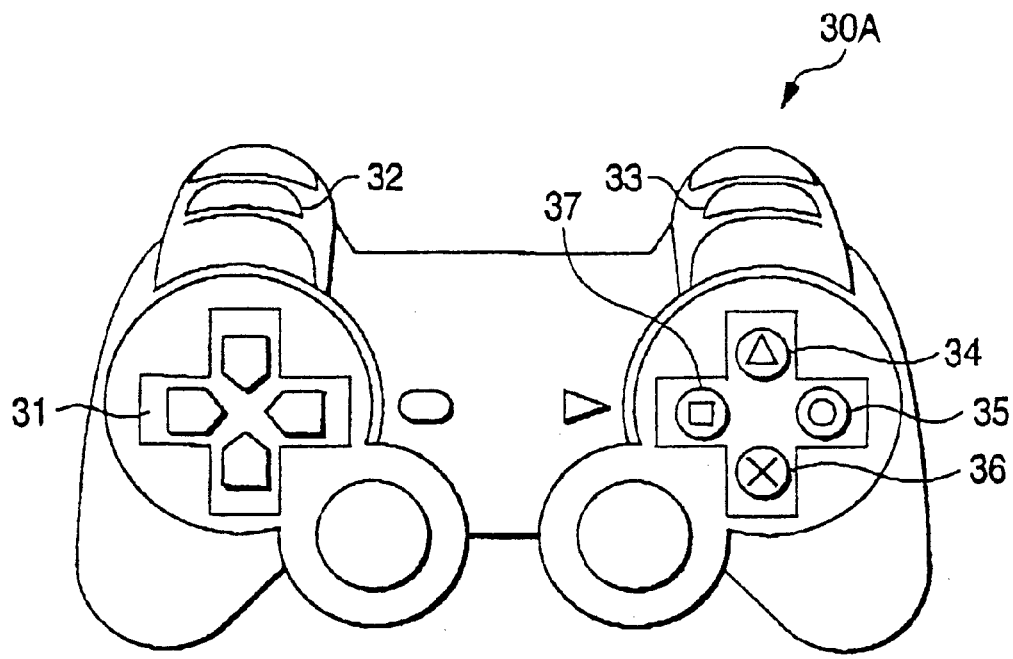
FIG. 3 is a perspective view of a keypad that can be used with the game machine shown in FIG. 1.

FIG. 3 shows an example of a structure of the keypad 30A. The other keypad 30B has the same structure. Direction keys 31 comprise four direction keys (arrow keys) for leftward, rightward, upward, and downward movements of a cursor displayed on the screen 21. The keypad further includes an L1 button 32, an R1 button 33, a triangle (Δ) button 34, a circle (○) button 35, a cross (x) button 36, and a square (□) button 37.

It is to be noted that the game machine utilizing the present invention is not limited to the illustrated system or the like. Obviously, display device, input device, CPU, or recording medium of other structure may be used.

Figure 4:
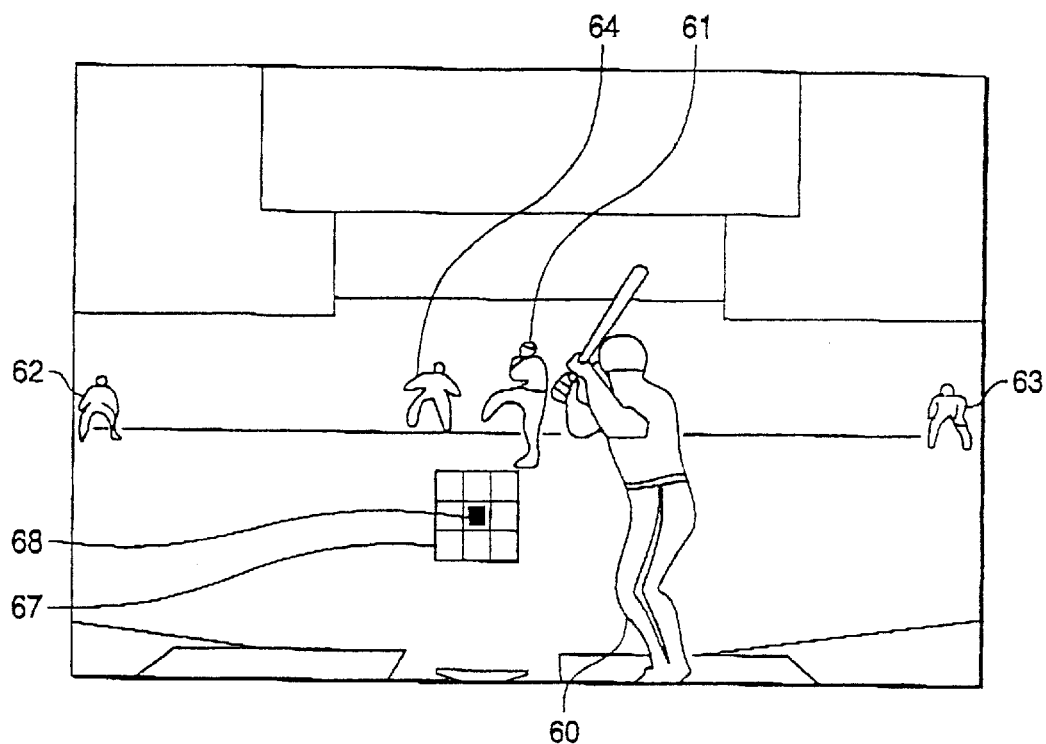
FIG. 4 schematically represents a frame of images displayed on screen when a baseball game is executed.

FIG. 4 shows one example of images displayed on the screen by a baseball game program used in the present embodiment. Baseball players such as a batter 60, a pitcher 61, fielders 62, 63, and a runner 64 are displayed. With respect to players in defense, it is possible to give instructions through one keypad such as the keypad 30A to the pitcher 61 to make a pitch or to peg the runner 64. With respect to players in offense, it is possible to give instructions through the other keypad 30B to cause the batter 60 to bat or to cause the runner 64 to attempt a steal.

To assist the batting of the batter 60, a strike zone 67 is displayed. This strike zone 67 is divided into nine regions of the same size. A player in offense watches the ball thrown from the pitcher 61 and forecasts the region of the strike zone 67 through which the ball will pass. He or she moves the cursor 68 into the forecast region using the direction keys 31, thus indicating the batting position.

Instructions for steal includes "steal" and "return". In particular, if the runner to which an instruction for steal is given is on first, second, or third, the right arrow key, the upward key, or the left arrow key of the direction keys 31 is operated to specify the runner. When all the runners on base are instructed to run, none of the direction keys in the direction keys 31 are operated.

"Run" is instructed using the L1 key 32. The runner keeps running while this key is being depressed. When the key is released, the runner comes to a stop. "Return" is instructed using the R1 key 33. The runner keeps running back to his original base while this key is being depressed. When this key is released, the runner comes to a stop. Stoppage of the runner is not instructed by operation of a dedicated key. Rather, when the L1 key 32 indicating "run" or the R1 key 33 indicating "return" ceases to be depressed, stoppage of the runner results.

When the runner is no longer instructed to "run", it is necessary to change the motion of the runner from "running motion" to "motion at rest". In the present invention, if the key operation of the game player ends in this way, and if it is necessary to modify the motion in step with the end, it is assumed that the game player has performed an additional input operation.

Before describing the motion transition method in accordance with the present invention, the fundamental processing for displaying character's motion images is described. To display each motion image of the character, a skeleton model representing the skeleton of the character is used.

Figure 5:
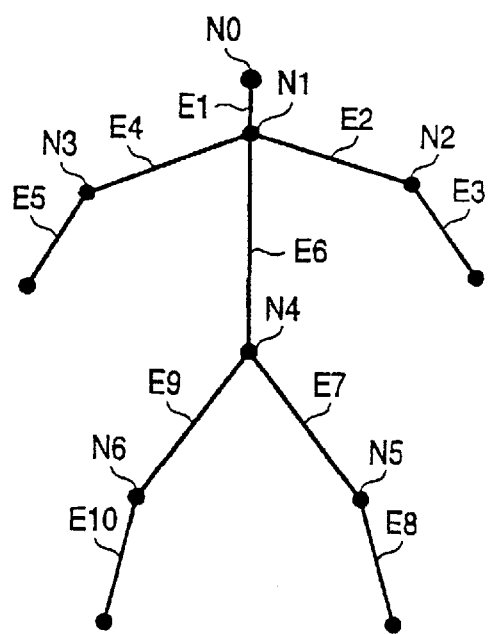
FIG. 5 is a view illustrating a skeleton model used in the present invention.

FIG. 5 shows one example of the skeleton model. Obviously, skeleton models of other structures can also be used.

The character is located in a 3D local space and represented by a skeleton model consisting of rectilinear arcs E1–E10 to indicate the neck, shoulders, limbs, and so on of a person. These arcs are connected together by joints N1–N6. For example, the first arc E1 indicates the neck. The arc E2 indicates one shoulder, which is coupled to the arc E1 via the joint N1. The arc E3 indicates one arm, which is coupled to the arc E2 via the joint N2. These joints will hereinafter be referred to as nodes.

Polygons indicating a limb or the like corresponding to each arc are defined in terms of model data described later. An image of the character made up of polygons is created.

Various methods are available to specify the position and direction of each arc. One method used herein is described below. Each arc is specified by its reference position and the angle of the arc. The reference point of the arc E1 lies at its end point N0. This reference point N0 is used also as the reference point for the whole skeleton model. The nodes (on the upstream side) closer to the arc E1 to which other arcs are connected are used as the reference points of these other arcs. For instance, the reference point of the arc E2 is the node N1.

The coordinates of the position of the reference point N0 within the local space are used as positional data about the arc E1. The angular coordinate of the arc E1 within the local space is used as angular data about the arc E1. As positional data and angular data about other arcs, coordinates and angular coordinates relative to an upstream arc are used. That is, as positional data about an arc, the position of the reference point of this arc relative to the reference point of the adjacent arc closer to the arc E1 is used.

Specifically, the difference between the coordinate of the position of the reference point of this arc in the local space and the coordinate of the position of the reference point of the adjacent upstream arc in the local space is used. For example, the position of the node N1 relative to the reference point N0 of the arc E1 is used as the positional data about the arc E2. That is, the differences between the coordinates (X2, Y2, Z2) of the position of the reference point N1 of the arc E2 and the coordinates (X1, Y1, Z1) of the reference point N0 of the arc E1 are used.

As angular data about an arc, the angle of this arc relative to the angle of the adjacent arc is used. That is, the difference between the angular coordinate of this arc in the local space and the angle of the adjacent arc in the local space is used. For example, the position of the arc E1 relative to the reference point N0 of the arc E1 is used as the angular data about the arc E2. That is, the differences between the angular coordinates (α2, β2, γ2) of the arc E2 and the angular coordinates (α1, β1, γ1) of the arc E1 are used. Preferably, the angles of arcs and other elements are represented using a quaternion. For the sake of simplicity, an angular coordinate is described using an Euler's angle.

As described thus far, data about each arc is composed of positional data and angular data. These two kinds of data contain 6 coordinate components in total. The positional data and angular data about each arc will hereinafter be collectively referred to as positional/angular data. Otherwise, they may be referred to as the data about the arc, as arc data, or as 6 coordinate components. The positional/angular data defined regarding all the arcs forming a skeleton model may be collectively referred to as the skeleton data.

Where an image representing a character is created based on a skeleton model, the positions and angles of arcs forming the skeleton model within a virtual space (world space) are determined. Specifically, the first arc E1 is placed within the virtual space based on the positional data and directional data about the character determined by the game program. That is, the position and angle of the arc E1 within the virtual space are determined according to the positional and directional data about the character.

As mentioned previously, the positional data and angular data about the arc E2 represent the position and angle relative to the arc E1. The position and angle of the arc E2 within the virtual space are determined according to these relative position and relative angle and according to the position and coordinates of the arc E1 within the virtual space. Similarly, the position and angle of the arc E10 are determined from the other arc E3 within the virtual space. Then, with respect to arcs that are located within the virtual space and determined in this way, the placement of polygons representing limbs and so forth corresponding to the arcs is determined using the model data. An object model representing the character is created.

Subsequently, the polygons are treated by a rendering technique such as a perspective transformation. The shapes and positions of polygons on the screen which form the object model are determined to represent the character displayed on the screen. The object model is texture-mapped. Colors, patterns, and so on are assigned to the various faces of the polygons forming the character. In this way, an image representing the state of the character is created and displayed on screen.

To display motion images of the characters, the aforementioned skeleton model is used for each frame. Accordingly, a collection of skeleton data about the different frames is data that defines motion images to be displayed. It would be natural to refer to this data as motion data.

Also, in the present embodiment, the skeleton data described above is used to display motion images of baseball players. However, to display motion images, it is not necessary that the collection of the skeleton data be previously stored as motion data in the RAM 103 as it is. A collection of skeleton data about different frames may be created from other data stored in the RAM 103.

Unlike the aforementioned collection of skeleton data, data previously stored in the RAM 103 used to generate a collection of the skeleton data is herein also referred to as motion data.

Figure 6:
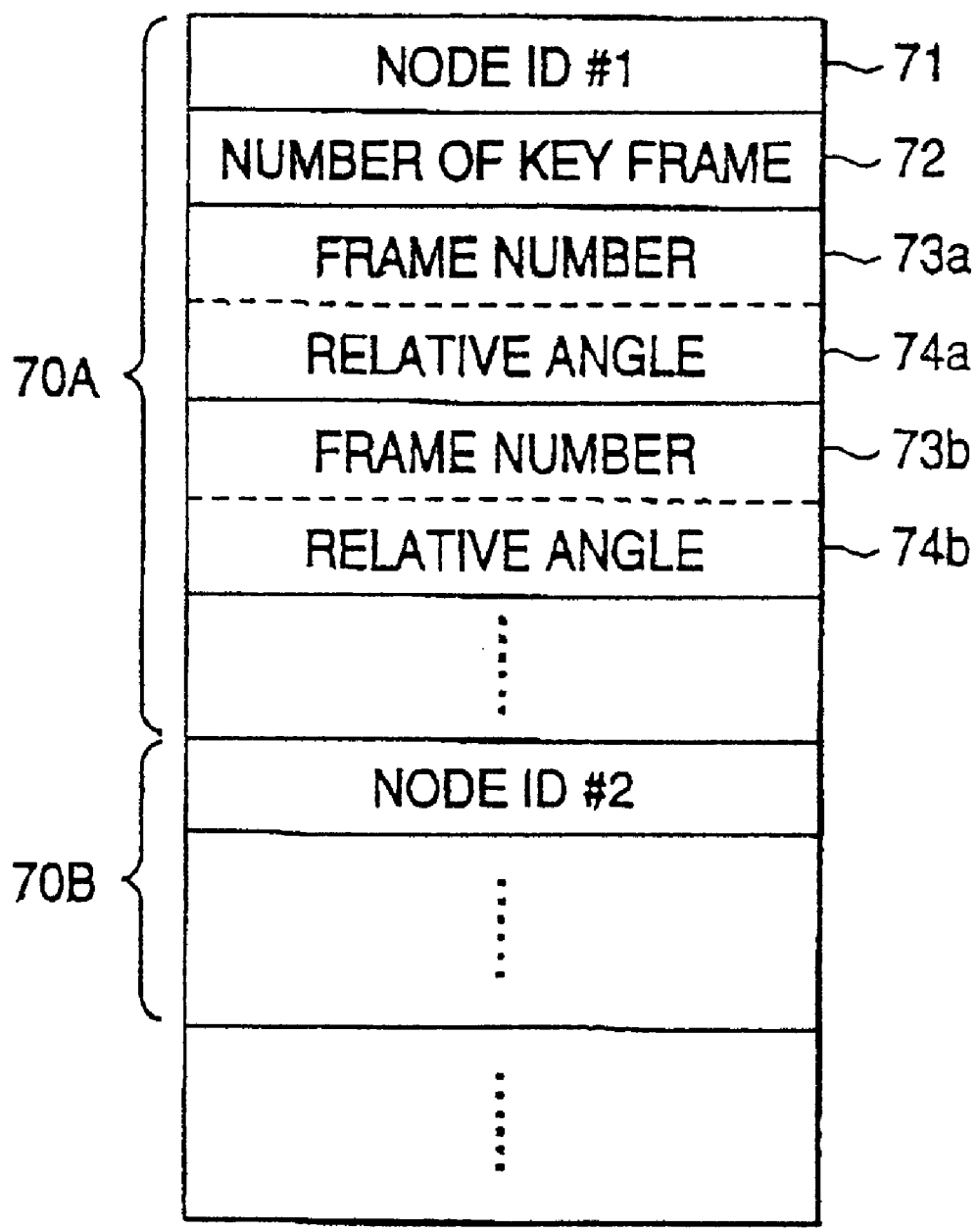
FIG. 6 is a diagram illustrating motion data stored in the RAM of the computer shown in FIG. 1.

FIG. 6 shows an example of motion data previously stored in the RAM 103 in the present embodiment. The motion data 70 consists of motion data element sets 70A, 70B, and so forth corresponding to individual nodes. Each motion data element set contains information 71 for identifying the corresponding node (hereinafter referred to as the node ID), the number of key frames 72 used by the motion data element set, the frame numbers 73a, 73b, etc. assigned to the key frames, and angles 74a, 74b, etc. of the key frames relative to the corresponding nodes.

As is well known, the key frame is a frame which is previously selected from a sequence of frames used to display animation and which represents this sequence of frames. Image data of each key frame has been previously determined and are used to generate image information about the key frames. Image information about frames other than key frames is created from each image data obtained by interpolating one pair of image data previously determined for a pair of key frames preceding and following, respectively, each frame of interest. In the present embodiment, multiple frames representing multiple postures representative of a sequence of postures varying with time are used as key frames.

As is well known in the art, the key frame here is a frame which is previously selected from a sequence of frames used to display animation and which represents this sequence of frames. Image data about each key frame has been previously determined and are used to generate image information about the key frames. Image information about frames other than the key frames is created from each image data obtained by interpolating one pair of images data previously determined for a pair of key frames preceding and following, respectively, each frame of interest. In the present embodiment, plural frames representing plural postures representative of a sequence of postures varying with time are used as key frames.

Each individual motion data element set contains information about only the corresponding node at the key frame. This reduces the amount of data to be stored as motion data. Furthermore, the number of frames and frame numbers used as key frames are determined at each node. In this way, the number of key frames necessary for each node can be optimized. Hence, the total amount of motion data is reduced further.

Furthermore, information about arcs connected to nodes stored for each key frame is only the relative angle of the arc. It does not contain the relative position of the arc. This further reduces the amount of motion data. The relative position of the arc is determined from the relative angle of the arc and from model data about the character to be displayed by a method described later.

Figure 7:
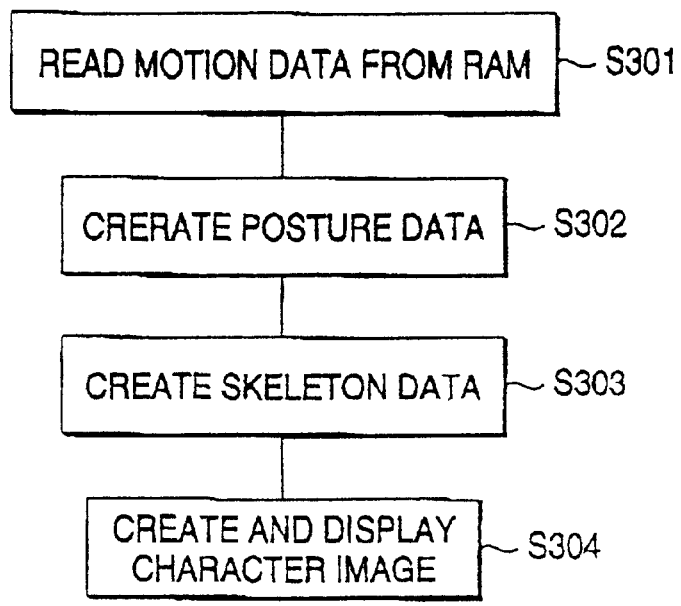
FIG. 7 is a flowchart illustrating exemplary fundamental processing performed where motion images are displayed by the game machine shown in FIG. 1.

The fundamental processing (S300) for general motion display using the motion data 70 is illustrated in FIG. 7. First, data about motions to be displayed is read from the RAM 103 (step S301). Whenever a new frame of image is displayed, posture data indicating the relative angle of each node at the frame is created based on the motion data 70 by the following method in order to generate an image of a player (character) to be displayed within the frame image (step S302).

The relative angle of each node at an arbitrary frame is determined by an interpolation technique by referring to the key frame information at that node. That is, a decision is made at each node to determine with which key frame at the node does this frame match. If a hit is found, the relative angle stored for the coincident key frame is used as the relative angle of the node at this frame. If no hit is found, the relative angle of this node at this frame is determined by interpolation from a pair of relative angles stored for a pair of key frames located on the opposite sides of this frame.

Figure 8:
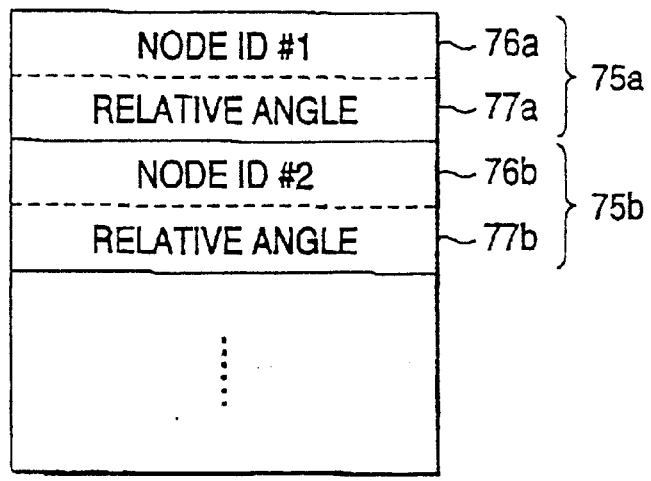
FIG. 8 is a diagram illustrating posture data created from motion data.

In this way, the posture data 75 shown in FIG. 8 is created. The data 75 contains data element sets 75a, 75b, etc. about the nodes, node IDs 76a, 76b, etc. and the relative angles 77a, 77b, etc. of the nodes at the frame.

The data 75 contains only the relative angle of each node. However, the length of each node is previously determined as described later. Accordingly, it can be considered that the data 75 indicates the posture of the player (character) at this frame. The data 75 will hereinafter be referred to as frame-specific posture data or simply as frame posture.

Figure 9:
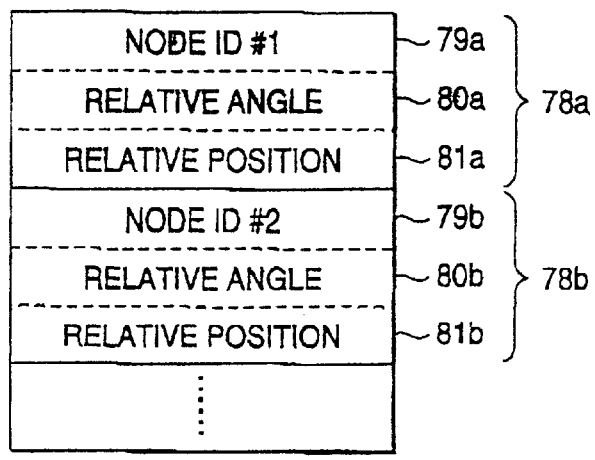
FIG. 9 is a diagram illustrating skeleton data created from the posture data.

Referring back to FIG. 7, skeleton data about this frame is created based on the posture data 75 (step S303). As illustrated in FIG. 9, the skeleton data 78 consists of data element sets 78a, 78b, etc. about the nodes at this frame. These data element sets contain node IDs 79a, 79b, etc., the relative angles 80a, 80b, etc. of the nodes at the frame, and the relative positions 81a, 80b, etc., respectively.

The relative position of each node is determined in the manner described below. In the present embodiment, actual professional baseball players are assigned to game characters, respectively, to increase the realism of the baseball game. The names of the actual players are assigned to the game characters. The game characters are represented to simulate the heads, the players' numbers on their backs, and the uniform of the actual professional players. Furthermore, the game characters simulate the physical bodies of the actual players.

Figure 10:
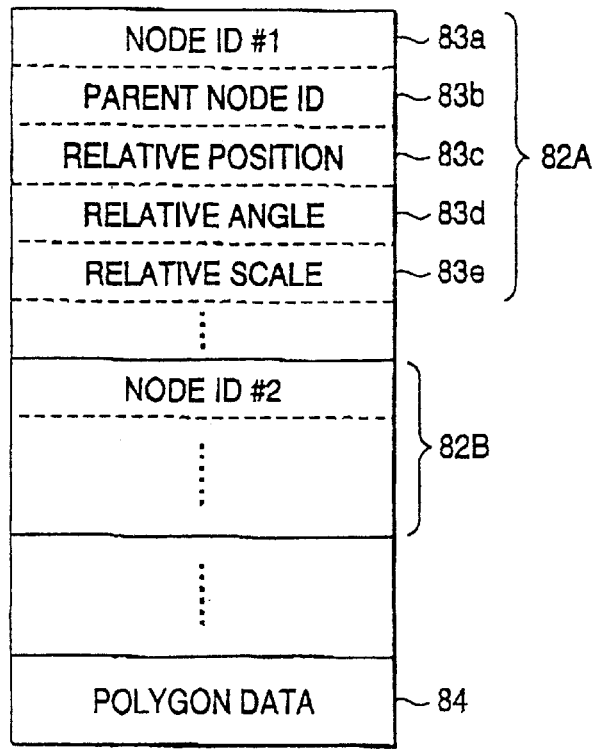
FIG. 10 is a diagram illustrating model data about a baseball player.

To accomplish such representations, player model data 82 has been previously determined for each player as illustrated in FIG. 10. The model data 82 includes model data element sets 82A, 82B, etc. about the different nodes. Each model data element set such as 82A and 82B includes the node ID 83a of the corresponding node, a parent node ID 83b of the upstream node to which the node is connected, the relative position 83c and relative angle 83d of each node when the corresponding game character is in its home position, and relative scale 83e for determining the size of the displayed game character.

Polygon data 84 for specifying polygons associated with each node are also contained. The polygon data 84 includes data about the structure of each polygon, texture data representing the player's number on the back, and texture data representing the uniform of the team to which the player belongs.

The length of the arc on the upstream side of each arc is calculated from the position 83c relative to each node. The relative position of the node at each displayed frame is calculated from the calculated length of the arc on the upstream side and from the relative angle of the node on the upstream side at this frame, the relative angle being contained in the posture data 75. In this way, the relative position of each node at this frame is determined, and the skeleton data 78 illustrated in FIG. 9 is determined.

Referring back to FIG. 7, an image of a game character representing a player is displayed at this frame, based on the created skeleton data 78 and using the player model data (step S304). A 3D image representing the face of a specific baseball player, the player's number on the back, and the uniform of the team to which the player belongs is generated.

The processing described thus far is repeated for the successive frames. In this manner, a motion image sequence of the game character is displayed.

Figure 11:
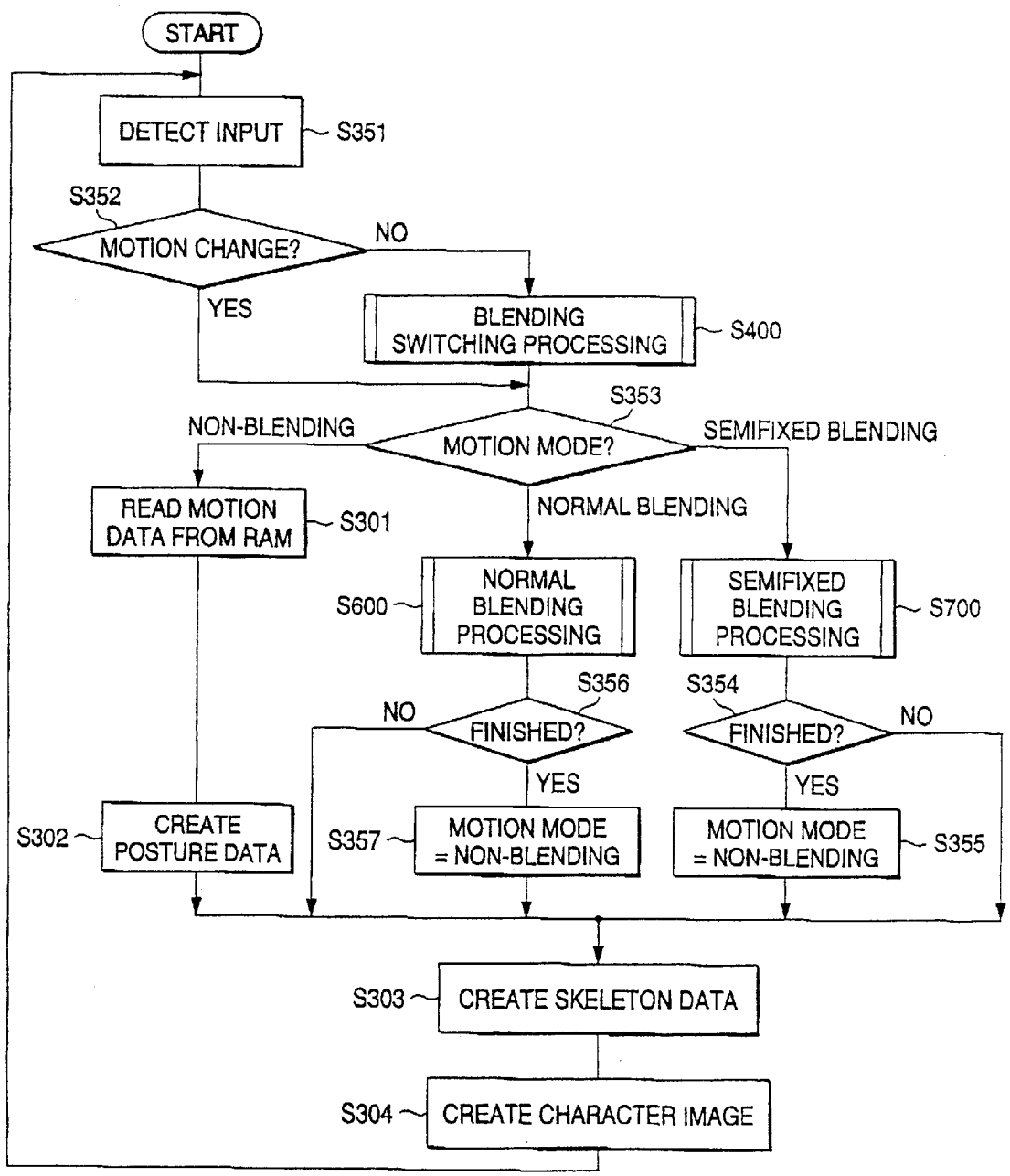
FIG. 11 is a flowchart particularly illustrating exemplary processing for displaying motion images.

Morphing, or transition of two motion images, in accordance with the present embodiment is hereinafter described in detail. FIG. 11 is a flowchart of motion display processing S350 including transition of motion images. Operation of a keypad 30A, 30B is detected (step S351). A decision is made based on the detected operation as to whether a motion image needs to be changed (step S352).

If the result of the decision is that the motion image needs to be changed, morphing switching processing S400 is performed. In the present embodiment, during blending, a transitional motion image sequence is created by morphing processing to make a smooth transition from the motion image being displayed (source image) to a target (destination) motion image. Multiple kinds of morphing processing can be switched and executed. In the morphing switching processing S400, one of these kinds of morphing processing is selected.

Figure 12:
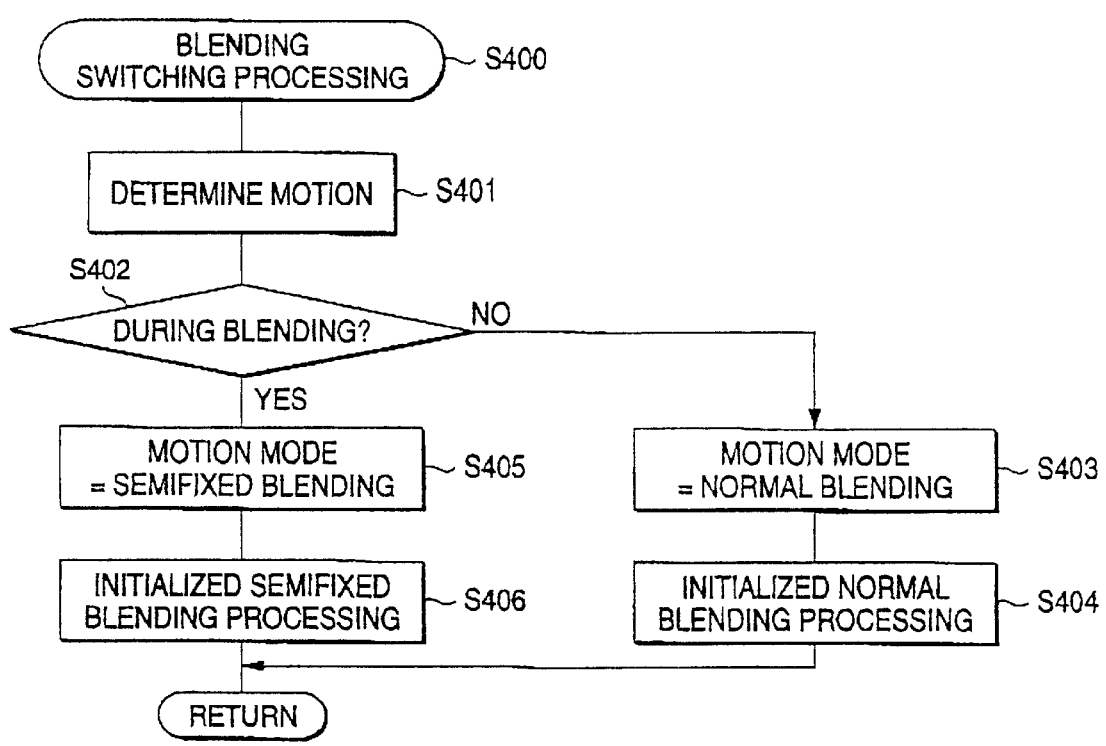
FIG. 12 is a flowchart illustrating exemplary morphing switching processing.

The morphing switching processing S400 is next described in detail by referring to FIG. 12. In the present embodiment, where it becomes necessary to morph two motion images for the first time, it is assumed that even if a source image is created by an ordinary morphing technique, unnatural posture of the character does not appear. For example, in a baseball game, if a "stop" instruction is given after a "run" instruction is given to a runner, the target motion image at rest does not need to be opposite in posture to the source running motion image. Therefore, if the running motion image and the rest motion image are morphed by an ordinary morphing technique, the obtained transitional image sequence of the runner do not contain unnatural postures. When the instruction given to the runner is changed from "stop" to "return", the same principle applies.

It is also assumed that when a first instruction that needs display of "run" motion image is given to the runner, a second instruction that needs display of a motion image involving a reverse motion such as "return" is not immediately given to the same runner. A third instruction that needs display of a motion image involving less posture change such as "stop" is given between the first and second instructions. Accordingly, when morphing is done first, the aforementioned problem does not take place if a transitional motion image sequence is created by normal morphing processing.

However, the game player may give a "return" instruction while a transition is being made from a running motion image to a standstill motion image. At this time, it is necessary to make a transition to a second transitional motion image sequence during display of the first transitional motion image sequence for making a transition from the running motion image (source image) to the standstill motion image (target image). The second transitional motion image sequence is closer to the target image than the first transitional motion image sequence. However, the initial portions of the first transitional motion image sequence are closer to the running motion image and thus are affected greatly by the running motion image of the runner who is running at a considerably high speed. The motion image being displayed is opposite in posture to the target motion image. Therefore, if the second transitional motion image sequence is created by a morphing technique, unnatural postures may appear in the transitional motion image sequence.

Generally, it is often known in advance that a transition from some motion image to other motion image is likely to occur in video games. With respect to combinations of these motion images, it is possible to prepare motion data about the source image and about the target image such that if a transitional motion image sequence is created by a morphing technique, unnatural postures do not appear in the transitional motion image sequence. However, if the second transitional motion image sequence is created by a morphing technique during display of the first transitional motion image sequence, appearance of unnatural postures cannot always be avoided. Accordingly, the above-described assumption is not specific to the present embodiment but is generally applied to video games.

Accordingly, in the present embodiment, when a transition to a new transitional motion image sequence should be made during morphing, the transitional motion image sequence is created using a special morphing technique (referred to as semifixed morphing processing) rather than normal morphing processing. In this way, appearance of unnatural postures in the transitional motion image sequence is prevented.

In particular, in the morphing switching processing S400, when a motion image needs to be changed, a target motion image is determined based on the operator's input (step S401). Then, desired morphing processing is selected in accordance with preset conditions. More specifically, as a selection condition, a decision is made as to whether two motion images are being morphed (step S401). That is, a decision is made as to whether the motion image being displayed is created by a morphing technique. This decision is made based on the motion mode described below.

The initial value of the motion mode is non-morphing mode and is 0, for example. The motion mode is maintained in this mode as long as a morphing operation is not started. As described later, if a morphing operation is started, the value is set to 1 or 2, depending on the kind of processing performed for the morphing operation.

At step s402, it is determined whether morphing is occurring. When morphing is not done (s402: No), normal morphing processing S600 is selected. As described later, during the normal morphing processing, to make a transition to a motion image sequence corresponding to a game player's input operation, posture data for the transitional motion image sequence is created by a method described later. For example, when the runner 64 is running, if a "stop" instruction is given, images of running motion of the runner 64 are not being created by morphing. Therefore, the normal morphing processing S600 is selected. Note that a stop motion is a motion of the runner who is slightly bending and stretching his or her legs in the same position. At this time, the transitional motion image sequence indicates a motion of the runner running at a slightly decreased speed compared with the running motion.

Selection of the normal morphing processing is carried out in the manner described below. First, the motion mode is set to normal morphing mode (step S403) For example, the motion mode is set to value 1. Furthermore, the normal morphing processing is initialized (step S404). In particular, a morphing frame number j that will be used in the normal morphing processing is set to 0.

If the result of the decision made in decision step S402 is that two motion images are being morphed, semifixed morphing processing S700 is selected. In this processing, to make a further transition of the morphed motion image of the character to a motion image corresponding to a game player's input operation, posture data for a transitional motion image sequence is created by a method (described later) different from the normal morphing processing S600.

The selection of the semifixed morphing processing S700 is performed in the manner described now. First, the motion mode is set to the semifixed morphing mode (step S405). For example, the motion mode is set to value 2. Then, the semifixed morphing processing is initialized (step S406). In particular, a variable k indicating the total number of frames created by morphing is set to 0. Thus, the morphing switching processing S400 ends.

For example, when the runner 64 is running, if a "stop" instruction is given, and if a "return" instruction is given to the runner while a transitional motion image sequence for making a transition from the running motion image to a stop motion image is being displayed, the transitional motion image sequence is created by the normal morphing processing S600. Therefore, additional transitional motion images for making a transition from the aforementioned transitional motion image sequence to a returning motion image sequence are created by the semifixed morphing processing S700.

Also, in cases where a further motion image transition is done during the execution of the semifixed morphing processing S700, the semifixed morphing processing S700 is newly activated to create a new transitional motion image sequence in the morphing switching processing S400.

Referring back to FIG. 11, the motion mode is judged after execution of morphing switching processing S400 (step S353). A different kind of processing is subsequently carried out according to the motion mode.

If the result of the decision made in step S352 is that motion change is not necessary, the motion mode is judged in step S353 without first performing the morphing switching processing S400. If the player performs no input operation, or if the player has performed an input operation that has not affected the motion currently being displayed, then it is not necessary to change the motion.

In this case, the motion mode of the currently displayed motion can be any one of non-morphing mode (i.e., not using morphing), normal morphing mode, and semifixed morphing mode. In particular, if neither the normal morphing processing nor the semifixed morphing processing has been carried out, then the motion mode is the non-morphing mode. When the morphing switching processing S400 is performed, the motion mode is changed either to the normal morphing mode or to the semifixed morphing mode as mentioned previously. In the immediately following frame, the normal morphing processing or the semifixed morphing processing is carried out, depending on the changed motion mode as described below. However, if any further input operation for changing the motion in the frame subsequent to the frame of interest is not performed, motion change is judged to be unnecessary in step S352. However, the motion mode is the normal morphing mode or the semifixed morphing mode.

If the result of the decision made in step S353 is that the motion mode is the non-morphing mode, the fundamental procedures for motion display are executed as already described in connection with FIG. 7. Specifically, necessary motion data is read from the RAM 103 (step S301). Posture data is created from this motion data (step S302). Then, skeleton data is created from the posture data (step S303). An image of a character is created and displayed in the next frame (step S304). Thereafter, the sequence beginning at step S351 is repeated.

If the result of the decision made in the decision step S353 is that the motion mode is the normal morphing mode, it follows that the normal morphing processing has been already selected in the morphing switching processing S400. This normal morphing processing S600 is carried out by a method described later, and posture data for a transitional motion image sequence is created.

Then, a decision is made as to whether morphing of motion images is completed (step S356). This decision depends on whether the total number of frames j created by morphing has reached a threshold value Na. If the morphing is not completed, skeleton data is created from posture data obtained by morphing (step S303). A character image is created from the skeleton data and displayed (step S304). Then, step S351 and subsequent steps are repeated. If the morphing is completed, the motion mode is set to non-morphing mode (step S357). Thereafter, steps S303 and S304 are carried out, and control returns to step S351.

If the result of the decision made in step S353 is that the motion morphing mode is the semifixed morphing mode, it follows that the semifixed morphing processing has already been selected in the morphing switching processing S400. The semifixed morphing processing S700 is executed by a method described later, and posture data for a transitional motion image sequence is created.

Then, a decision is made as to whether morphing of the motion images is completed (step S354). This decision depends on whether the total number of frames k created by morphing has reached a threshold value Nb as described later. If the morphing is not completed, skeleton data is created from the posture data obtained by the morphing (step S303). A character image is created from the skeleton data and displayed (step 304). Then, step S351 and the ensuing steps are repeated. If the morphing is completed, the motion mode is set to non-morphing mode (step S355). Then, steps S303 and S304 are carried out, and control goes back to step S351.

Figure 13:
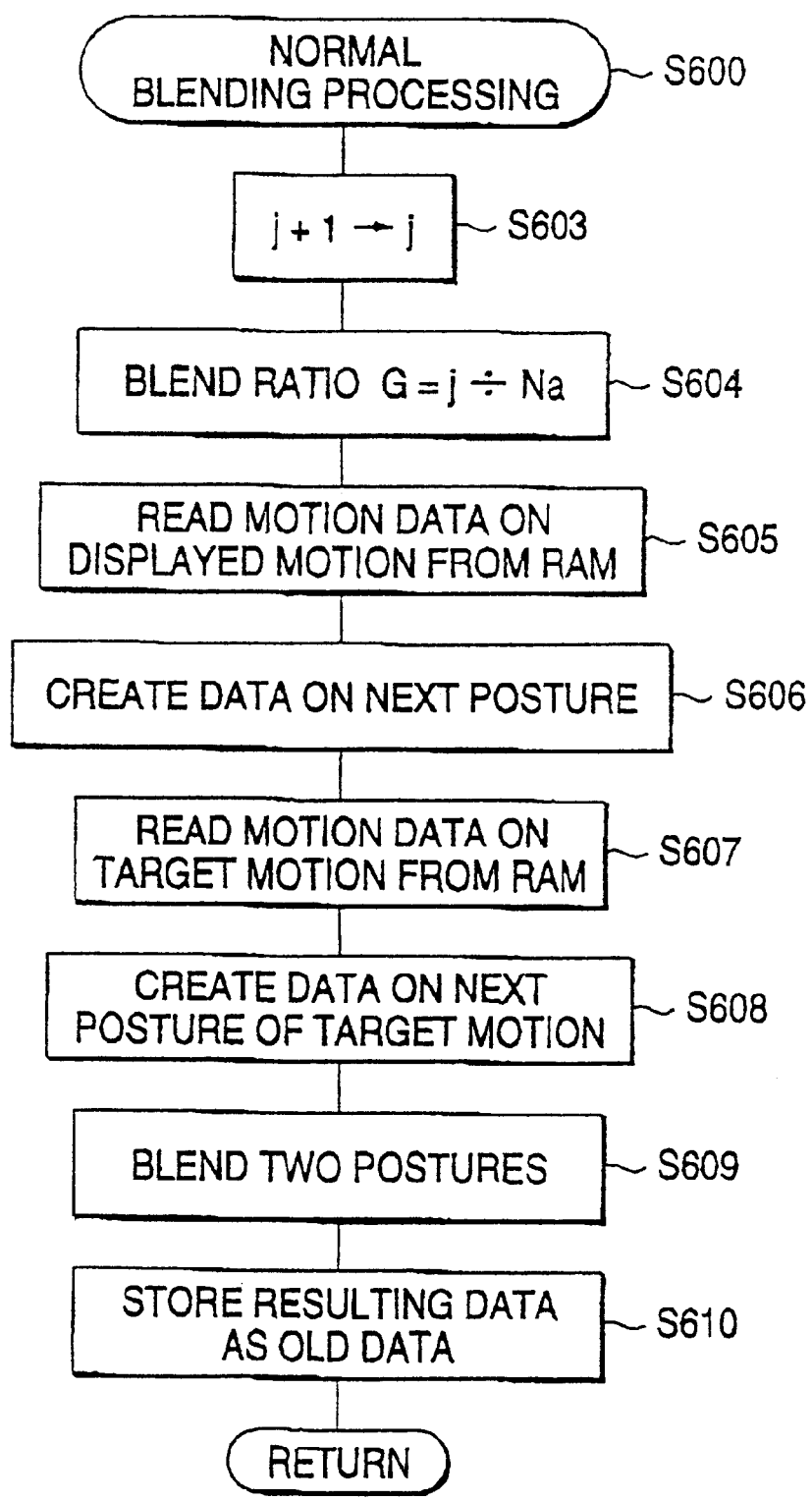
FIG. 13 is a flowchart illustrating exemplary normal morphing processing.

The normal morphing processing S600 is effected in the manner described below as illustrated in FIG. 13.

In this processing S600, a transitional motion image sequence permitting a smooth transition from the motion image of the character currently displayed to a target motion image are created from the currently displayed motion image and from the target motion image by morphing. That is, a posture image sequence later than the start of morphing (i.e., later than the image currently displayed) and a posture image sequence defining initial motion portions of the target motion image are morphed for successive frames. Thus, a posture image sequence defining a transitional motion image sequence is created.

The morphing processing is carried out based on the threshold value Na of the total number of frames formed by morphing. For example, the threshold value Na is 5 to 20. The morph frame number j is increased by 1 (step S603). As mentioned previously, in the step S406 of the morphing switching processing S400 illustrated in FIG. 12, the morph frame number j is preset to an initial value of 0.

Blend ratio G is calculated using the following equation (1) (step S604). The blend ratio G is the morph ratio of the target motion image. The morph ratio of the motion image currently displayed is 1−G.

$$G = \frac{j}{Na} \quad (1)$$

Then, motion data for specifying the currently displayed motion image is read from the RAN 103 (step S605). Data regarding a sequence of postures following the start of morphing includes data of a posture (referred to as "next posture data") that specifies the posture of the image of the character displayed at the next frame. The next posture data is created from the motion image data read out (step S606). The method of creating posture data from motion image data has been already described in connection with step S302 of FIG. 7.

Motion data that specifies a target motion image (i.e., destination motion image) is read from the PAM 103 (step S607). Data about a next posture of the target motion image is created (step S608). The two sets of posture data created by steps S606 and S608, respectively, are synthesized into one at the blend ratio G determined in step S603 (step S609).

In this morphing processing, the relative angles (e.g., $\alpha_s$, $\beta_s$, $\gamma_s$) of the various nodes possessed by the currently displayed motion posture and the relative angles (e.g., $\alpha_t$, $\beta_t$, $\gamma_t$) of the same nodes possessed by the first posture of the target motion image are synthesized into morphed relative angles ($\alpha_c$, $\beta_c$, $\gamma_c$) at the blend ratio G. These morphed relative angles ($\alpha_c$, $\beta_c$, $\gamma_c$) are calculated using Equations (2a)–(2c) below. This sequence of calculations is performed for every node of the skeleton. A series of relative angles calculated from all of the nodes constitutes data about the morphed posture. It is assumed herein that the relative angles contained in the two sets of data about the two postures are defined by Euler's angles.

$$\alpha_c = \alpha_s \times (1-G) + \alpha_t \times G \quad (2a)$$

$$\beta_c = \beta_s \times (1-G) + \beta_t \times G \quad (2b)$$

$$\gamma_c = \gamma_s \times (1-G) + \gamma_t \times G \quad (2c)$$

As described below, if a further motion image transition is attempted during the execution of this motion image transition, the posture data finally obtained in this morphing processing is used. To enable this, whenever posture data is created by morphing, it is saved in the RAM 103 as old posture data (step S610).

After the morphed posture data is created, control returns to the processing of FIG. 11. As already described, skeleton data is created by step S303. An image of a character is created in step S304 and displayed at the next frame. Then, the processing of FIG. 11 is repeated to create images of the character for the subsequent frames.

Whenever the normal morphing processing S600 is called by the processing of FIG. 11, the steps S603–S609 of FIG. 13 are carried out. As a result of this iterative process, if the morph frame number i agrees with the threshold value Na, step S356 of FIG. 11 judges that the normal morphing processing S600 has completed. Newly created posture data is stored in memory at step S610 so as to overwrite the previously stored old posture data. That is, the stored data is updated.

As described above, the blend ratio G increases in equal increments from 1/Na. Morphing is performed for (Na−1) frames, i.e., until the blend ratio G reaches its maximum value of (1−1/Na).

Figure 14A:
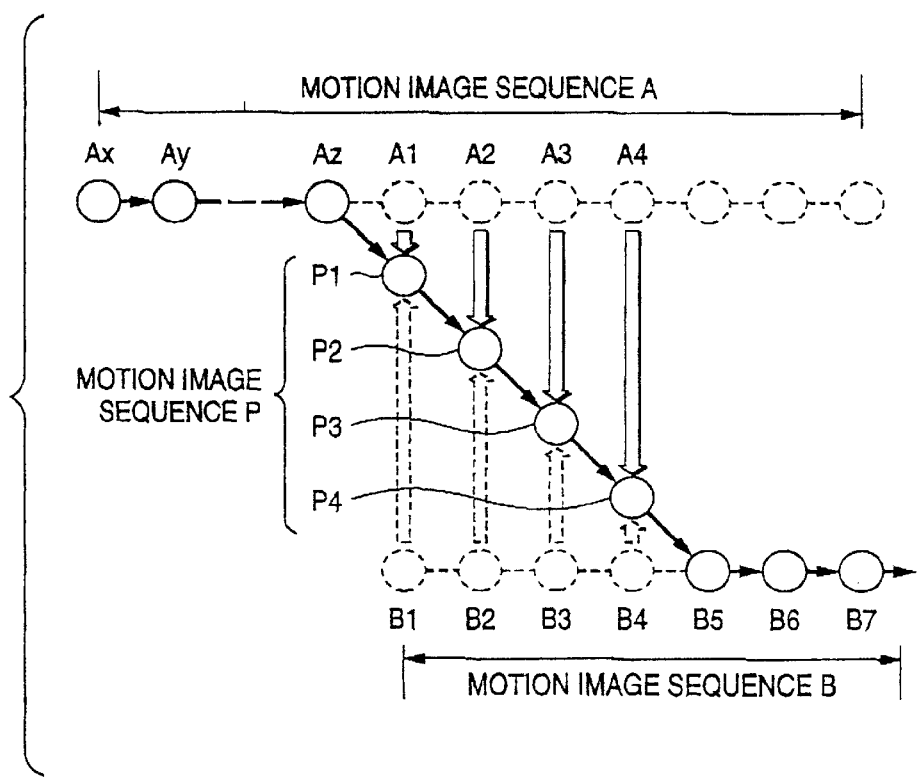
FIG. 14A is a diagram illustrating an example of a transition of motion made by the normal morphing processing.

FIG. 14A shows one example of a morphing process using the normal morphing processing S600. It is assumed that a sequence of character images defined by a series of character posture data element sets Ax, Ay, . . . , Az is displayed according to motion data defining a sequence of motion images A, by repeatedly executing the steps S301–S304 of FIG. 11. Furthermore, it is assumed that a game player's input operation is performed when an image of a character based on posture data Az is being displayed and that the result of the decision made in response to the input operation in step S352 (FIG. 11) is that a transition to a sequence of motion images B is necessary. The threshold value Na for the total number of morphed frames used for the transition is assumed to be 5.

In FIG. 14A, A1, A2, and so on, represent a sequence of posture data that is included in a sequence of posture data for displaying a motion A in a sequence of frames that that is subsequent to posture data Az. B1, B2, and so on, represent a sequence of posture data for representing motion B by successively different frames. To determine a transitional motion sequence, the first posture data A1, after the start of transition from the motion A, and the first posture data B1 and the motion B are morphed at a morph ratio 1/5. Thus, data P1 representing the first posture of the transitional motion image sequence is obtained. Subsequently, data A2, A3 and A4 of postures subsequent to motion data A1 and data B2, B3, B4 at postures subsequent to motion data B1 are similarly combined, at morph ratios of 2/5, 3/5 and 4/5, respectively, to form data P2, P3, and P4 representing a sequence of morphed postures. Thus, the morphing is completed into the motion B. In this manner, a sequence of transitional motions P, specified by data P1, P2, P3, and P4, representing a sequence of postures is displayed. If data A5 of the posture subsequent to motion data A1, and data B5 of the posture subsequent to motion data 31 are combined, the morph ratio is 5/5, which would result a morphing that is the same as posture data B5 of motion B. In the present embodiment, therefore, the posture data A5 and the posture data B5 are not morphed. Generally, when the morph ratio reaches (1−1/Na) (where Na is a threshold value for the total number of morphed frames), the morphing processing is ended as described. Then, subsequent portions of motion B are displayed based on posture data B5, B6, B7, and so on, subsequent to molion data B4.

As can be seen from the description above, data about a series of initial postures defining the initial portions of the sequence of the target motion image sequence B are used to create the transitional motion image sequence P. Therefore, the effect of the sequence of motion images B on the transitional motion image sequence P gradually increases. As a result, a transition of motion images introduces essentially no delay in the display of the motion image sequence B.

Furthermore, the data A1, A2, A3, and A4 about the postures of the sequence of motion images A subsequent to the start of the morphing process are used for generation of the transitional motion image sequence. Therefore, the motion image of the character makes a gradual transition from the sequence of motion images A to the sequence of motion images B while the effect of the sequence of motion images A remains. It is expected that the transitional motion image sequence P accomplishes a smooth transition from the motion image sequence A to the motion image sequence B except for the case in which the motion image sequences A and B are a combination of special motion images.

However, where the two motion image sequences A and B are a combination of special motion images as encountered when the two motion image sequences A and B need motions that are opposite in direction, if motion images are created by normal morphing processing, unnatural postures will be contained in the morphed images. In such a combination of special motion images, the normal morphing processing S600 is not adapted for a transition between these two motion image sequences.

Figure 14B:
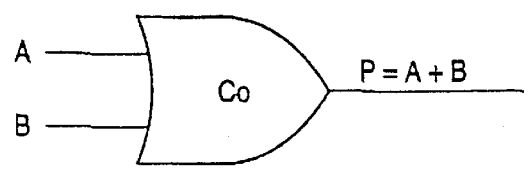
FIG. 14B is a diagram illustrating an exemplary logic circuit used for the transition illustrated in FIG. 14A.

The normal morphing processing S600 may be described using logical operator symbols as shown in FIG. 14B. In this example, motion image sequences A and B are morphed into a motion image sequence P by normal morphing processing Co.

Figure 15:
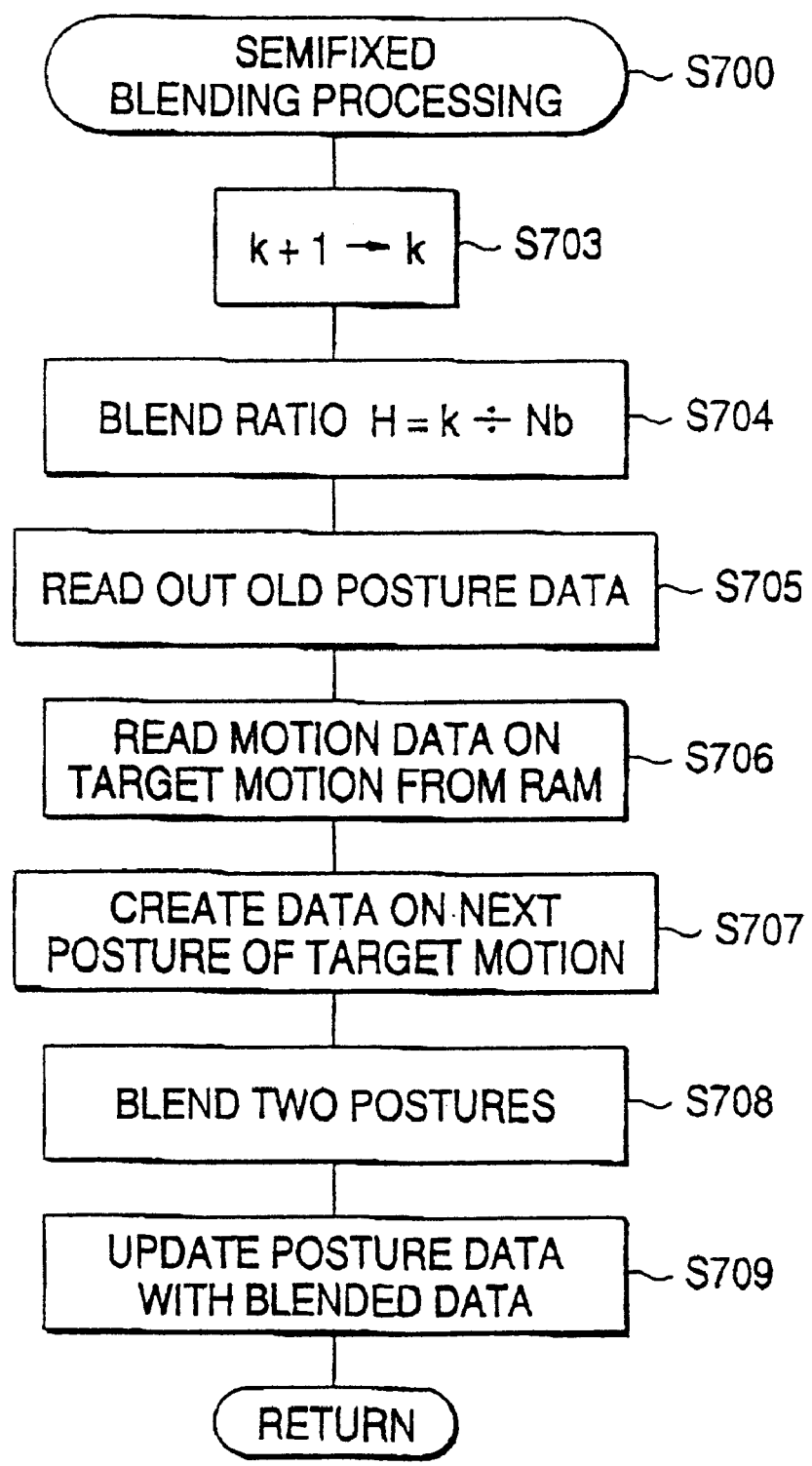
FIG. 15 is a flowchart illustrating exemplary semifixed morphing processing in accordance with the invention.

The semifixed morphing processing S700 is effected as illustrated in FIG. 15. In this processing S700, a transitional motion image sequence for accomplishing a smooth transition from the currently displayed motion image of a character to a target motion image is created by synthesizing last postures of the currently displayed motion image sequence and the target motion image. That is, postures used for the display of the character image immediately before the morphing process and a series of initial postures defining the initial motion portions of the sequence of target motion images are synthesized for successive frames. In this way, a posture image sequence defining the transitional motion image sequence is created.

In the normal morphing processing S600, data about a sequence of postures defining those image portions of the currently displayed motion image which are displayed after the start of a morphing process is used for creation of a transitional motion image sequence. The semifixed morphing processing S700 differs from the normal morphing processing S600 in that data about those posture images of the currently displayed motion image created immediately before the morphing process are used for creation of a transitional motion image sequence. In the semifixed morphing processing S700, what is combined with the target motion image by morphing is fixed to a certain posture image of the currently displayed motion image that is prior to the start of the morphing process. Hence, this morphing processing is referred to as semifixed morphing processing.

In particular, in FIG. 15, Nb and k indicate a threshold value for the total number of morphed frames and morph frame number, respectively, similarly to Na and j in FIG. 13. First, the morph frame number k is increased by 1 (step S703). As already described, the morph frame number k is preset to an initial value of 0 in step S404 of the morphing switching processing S400 of FIG. 12. The morph ratio H is calculated in the same way as the ratio G (step S704).

Old posture data is read out (step S705). The old posture data read at step S705 when this step is first carried out is data about the posture of a character displayed last as the original motion image which was determined immediately prior to the morphing process by normal morphing processing. This data about the posture is stored at step S610 of the normal morphing processing S600.

Motion image data defining the target motion image is read from the RAM 103 (step S706). Posture data indicating the posture of the character at the next frame of the target motion image sequence is determined (step S707). This posture data of the target motion image sequence and the old posture data read at step S705 are synthesized at the morph ratio H (step S708).

As described below, if a further motion image transition is attempted using the semifixed morphing processing S700 during the execution of this motion image transition, the posture data finally obtained by the semifixed morphing processing S700 is used. To allow for this, if posture data is created by step S708, the old posture data already stored in the RAM 103 by the normal morphing processing S600 is overwritten by the post-morphing posture data obtained by step S708 (step S709). Whenever the semifixed morphing processing S700 is repeated, old posture data is updated in step S709. As a result, posture data obtained by the newest morphing is saved as old posture data.

If the posture data is created by morphing in this way, corresponding skeleton data is created by step S303 of FIG. 11, in the same way as in normal morphing processing S600. Furthermore, an image of the character is created by step S304 and displayed at the next frame. Subsequently, the processing of FIG. 11 is repeated to create images of the character for the following frames.

Whenever the semifixed morphing processing S700 is called by the processing of FIG. 11, the steps S703–S709 of FIG. 15 are carried out. If the number of morph frame number k becomes equal to the threshold value Nb as a result of this iterative processing, step S354 of FIG. 11 judges that the semifixed morphing processing S700 has been completed.

In the description above, the old posture data read out when the step S705 is repeated is posture data already updated at step S709. Accordingly, in the present embodiment, posture data synthesized by the semifixed morphing processing S700 is used to create posture data for the next frame. That is, the posture data created in step S708 is recursively used.

Accordingly, the semifixed morphing processing S700 in the present embodiment may be referred to as recursive semifixed morphing processing. As described later, in recursive semifixed morphing processing, the last posture of the motion image sequence displayed before the start of a morphing process and the target motion image are morphed at a nonlinearly increasing morph ratio.

Figure 16A:
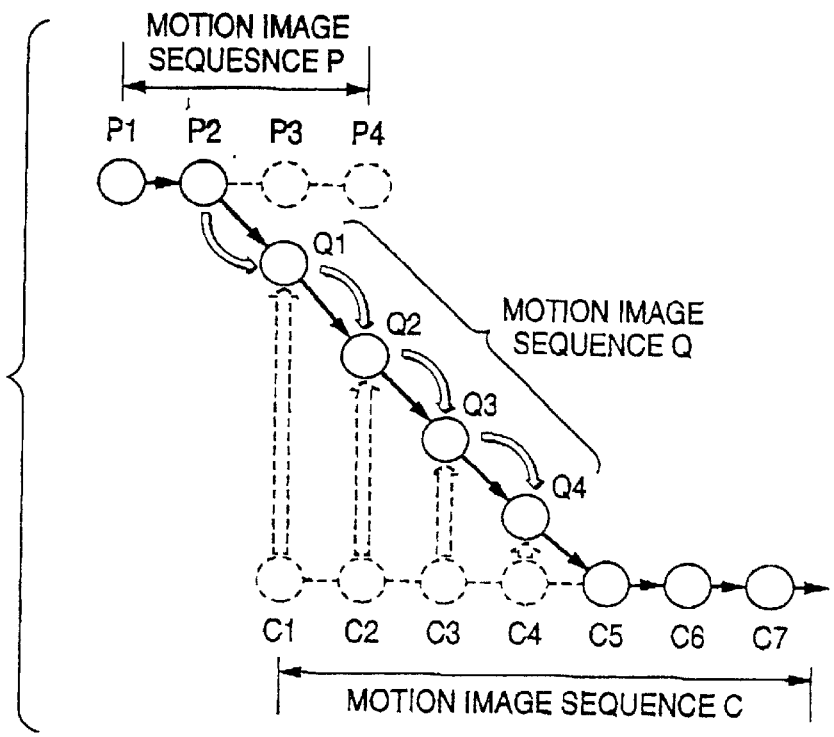
FIG. 16A is a diagram illustrating one example of a transition of motion where the semifixed morphing processing is performed.

An example of morphing using the semifixed morphing processing S700 is shown in FIG. 16A. A sequence of motion images P is a transitional motion image sequence for a transition from a motion image sequence A to a motion image sequence B, as shown in FIG. 14. Posture data element sets P1, P2 defining the motion image sequence P are generated in turn by the method described in connection with FIG. 14. A sequence of images of a character defined by these posture data element sets is displayed. It is assumed that a game player performs an input operation while an image of the character defined by the posture data element set P2 is being displayed, and that the result of the decision made in step S352 of FIG. 11 is that it is necessary to modify the motion image sequence in response to the input operation. It is also assumed that the threshold value Nb for the total number of morphed frames used for a transition is five.

If the result of the decision is that a motion image transition is necessary, the morphing switching processing S400 is activated as illustrated in FIG. 11. In this case, the semifixed morphing processing S700 is selected as illustrated in FIG. 12 in this processing S400.

The semifixed morphing processing S700 is repeatedly called as illustrated in FIG. 11, so that posture data about a new transitional motion image sequence Q is created. First, posture data P2 about the last displayed posture image of the currently displayed motion image sequence P of the character is read out as old posture data (step S705 of FIG. 15). Data C1 about the first posture of the motion image sequence B is created (steps S706 and S707 of FIG. 15).

These two posture image sequences are morphed at the morph ratio 1/5 (step S708 of FIG. 15). Data Q1 about the first morphed posture is derived. Then, the first image of the transitional motion image sequence is displayed by the steps S303 and S304 of FIG. 11. In step S709 of FIG. 15, the posture data Q1 overwrites the old posture data stored by the normal morphing processing S600, thus updating the stored data.

The newly stored posture data Q1 and the second posture data C2 of the motion image sequence C are synthesized into second transitional posture data Q2. A corresponding character image is created. Similarly, recently created posture data Q2, Q3 about the motion image sequence and posture data C3, C4 about the motion image sequence are synthesized into posture data Q3, Q4. In this way, the morphing process is completed.

Thus, a sequence of transitional motion images Q specified by the sequence of posture data Q1, Q2, Q3, and Q4 is displayed. Then, the ensuing portions of the motion image sequence C are displayed according to the ensuing posture data C5, C6, C7, etc. about the motion image sequence C.

As can be seen from the description above, a sequence of initial posture data element sets defining initial portions of the transitional motion image sequence C is used to create the transitional motion image sequence Q. Accordingly, the effect of the motion image sequence C on the transitional motion image sequence Q increases gradually. As a result, it can be said that the transition of motion images introduces substantially no delay in the display of the motion image sequence C.

The posture data P2 defining the last posture of the motion image sequence P displayed prior to the morphing process is used for the creation of the transitional motion image sequence. The ensuing posture data such as P3 about the motion image sequence P are not used. Accordingly, it can be expected that the obtained motion image sequence Q shows natural variations even if the motion image sequence P and the motion image sequence C are a certain combination not adapted for morphing using the normal morphing processing S600. Consequently, if the motion image sequences P and C involve motions that are opposite to each other in direction, for example, the semifixed morphing processing S700 is adapted for use for morphing between these motion image sequences.

In the semifixed morphing processing S700, a morphing process is carried out recursively and so the morph ratio increases substantially nonlinearly. This is described next by referring to FIG. 16A.

Let $\alpha s_1$ be the relative angle of a node where each posture data element set $P_i$ (i=1, 2, . . . ) about a motion image sequence P is present. Let $\alpha t_i$ be the relative angle of the same node where each posture data element set $C_i$ (i=1, 2, . . . ) about a motion image sequence C is present. Let $\alpha c_i$ be the relative angle of the same node where each posture data element set $Q_i$ (i=1, 2, . . . ) about a motion image sequence Q is present. Let $G_i$ be the morph ratio at which posture data element sets $Q_i$ are morphed. In the following description, only the relative angle $\alpha$ of the three relative angles $\alpha$, $\beta$, $\gamma$ of each node is described. The same principles apply to the other relative angles.

With respect to the relative angle $\alpha c_1$ of the first posture image Q1 of the transitional motion image sequence Q, the following Equation (3) provides:

$$\alpha c_1 = \alpha s_1 \times (1-G_1) + \alpha t_1 \times G_1 \tag{3}$$

With respect to the relative angle $\alpha c_2$ of the second posture image Q2 of the transitional motion image sequence Q, the following Equation (4) provides:

$$\alpha c_2 = \alpha c_1 \times (1-G_2) + \alpha t_2 \times G_2 \tag{4}$$

Rewriting equation (4) using equation (3) results in:

$$\alpha c_2 = \alpha s_1 \times (1-G_1) \times (1-G_2) + \alpha t_1 \times G_1 (1-G_2) + \alpha t_2 \times G_2 \tag{5}$$

Substituting $G_1 = 1/5$ and $G_2 = 2/5$ gives rise to:

$$\alpha c_2 = \alpha s_1 \times \frac{4}{5} \times \frac{3}{5} + \alpha t_1 \times \frac{1}{5} \times \frac{3}{5} + \alpha t_2 \frac{2}{5} \tag{6}$$

Therefore, the substantial morph ratio for the relative angle $\alpha s_1$ of the source motion image sequence P is $(4/5) \times (3/5)$, which is a decrease of 80% of the morph ratio 3/5 of the relative angle $\alpha s_2$, the latter ratio being determined by the morph ratio $G_2$. This decrease in the ratio becomes greater in the case of later motion images Q3 and Q4 of the motion image sequence Q.

In particular, in the recursive semifixed morphing processing S700, the effect of the last posture image P2 of the original motion image sequence P on the motion sequence Q (i.e., the degree to which the posture of motion Q is varied by posture P2) increases with morph frame number k at a rate higher than the rate of increase of morph frame number k, i.e., increases nonlinearly. Accordingly, the posture image varies in such a way that it rapidly approaches the initial posture images of the subsequent portions of the target motion image sequence C from the last posture image of the source motion image sequence P. A more rapid transition of motion image is accomplished on screen.

Figure 16B:
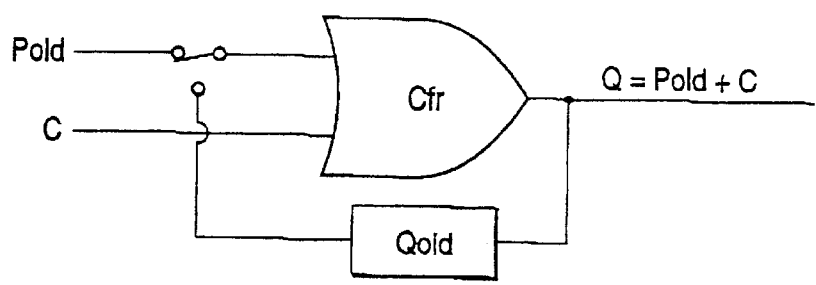
FIG. 16B is a diagram illustrating a logic circuit used to achieve the transition illustrated in FIG. 16A.

The recursive semifixed morphing processing S700 may be described using logical operator symbols as shown in FIG. 16B. In this example, old posture data Pold of a motion image sequence P and the target motion image sequence C are morphed into a transitional motion image sequence Q by recursive semifixed morphing processing Cfr. Posture data about the obtained motion image sequence is subsequently used as old posture data Qold to create next posture data instead of the old posture data Pold about the motion image sequence P.

Figure 17:
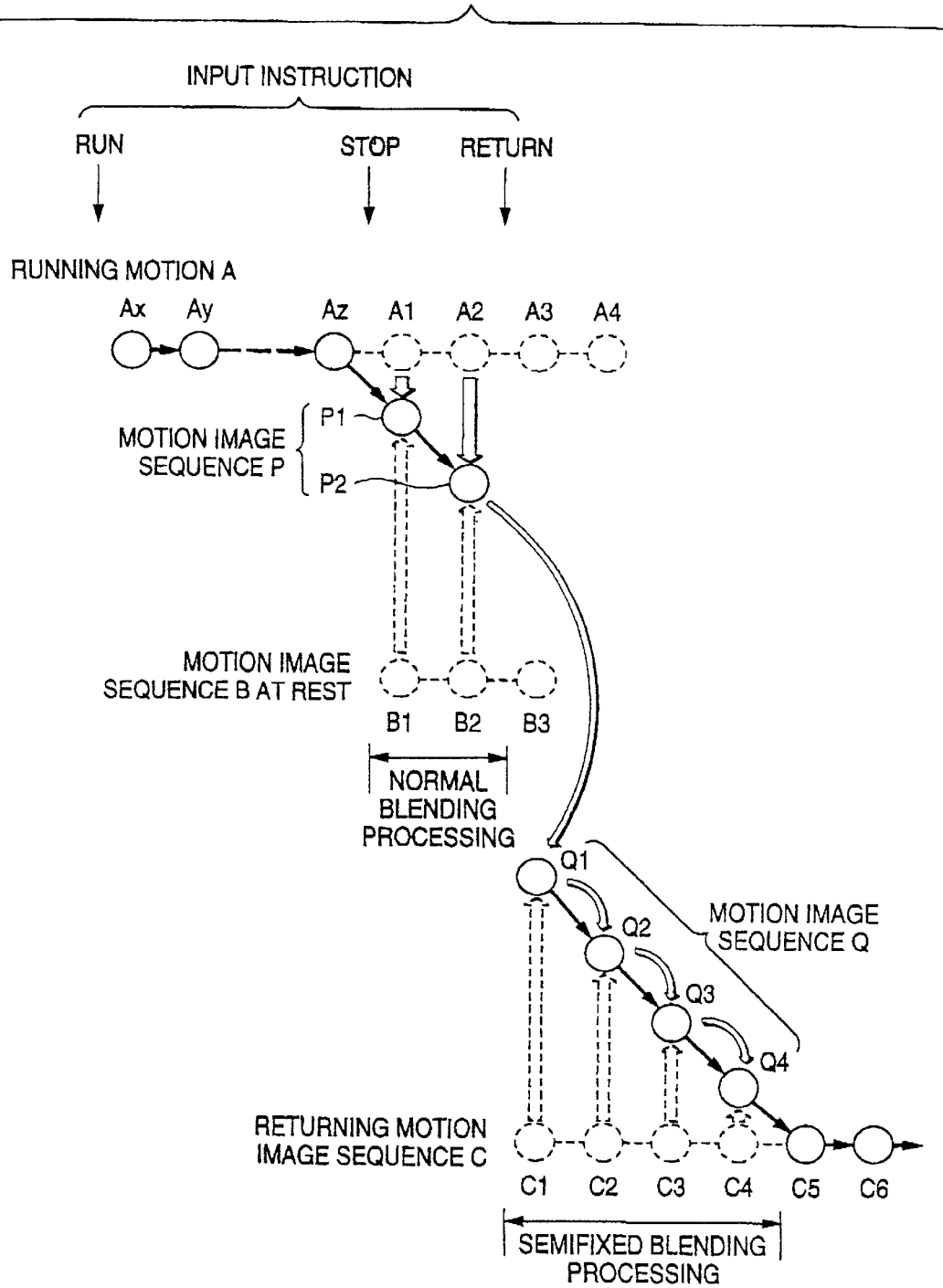
FIG. 17 is a diagram illustrating one example of a transition of motion made in a baseball game.

FIG. 17 shows a specific example of a method of displaying a motion image sequence in a baseball game in accordance with the present embodiment. In this figure, a motion image sequence A indicates images of motion of a runner 64 (FIG. 4) who is running. A motion image sequence B indicates images of the runner 64 when he is at rest. A motion image sequence C indicates images of the runner 64 when returning to the original base.

When the motion image sequence A is displayed in response to an input operation, if a "stop" instruction is given by another input operation during the display of the motion image sequence A, a transitional motion image sequence P is created using the normal morphing processing S600 to make a transition from the motion image sequence A to the motion image sequence B as described in connection with FIG. 14A. If a "stop" instruction is given by an input operation during display of the transitional motion image sequence P, the transitional motion image sequence Q is created using the semifixed morphing processing S700 as already described in connection with FIG. 16A.

The motion image sequence P is a motion image sequence for a transition from the running motion image sequence A to the rest motion image sequence B. This motion image sequence P indicates images of motion of the character when the runner gradually decreases its speed and comes to a stop. Accordingly, when this motion image sequence P is started to be displayed, the runner might still be running at a high speed.

A returning motion image sequence C indicates a motion of running that is opposite in direction to the running motion A. If these motion image sequences P and C are morphed by the normal morphing processing S600, the obtained transitional motion image sequence may contain images indicating unnatural motions of the limbs. In the present embodiment, however, when a transition is made from the motion image sequence P to the motion image sequence C, a transition is made from the last posture of the motion image sequence P to the motion image sequence C. Consequently, the transitional motion image sequence Q showing smooth motions can be displayed.

Figure 18A:
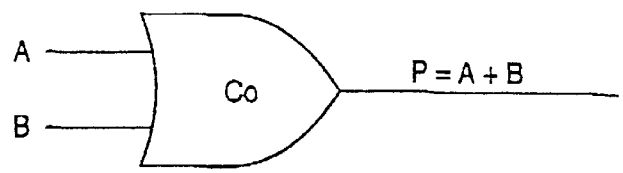
FIGS. 18A, 18B, and 18C are diagrams illustrating symbols of logical operators used where the transition of motion illustrated in FIG. 17 is made.
Figure 18A:
Figure 18B:
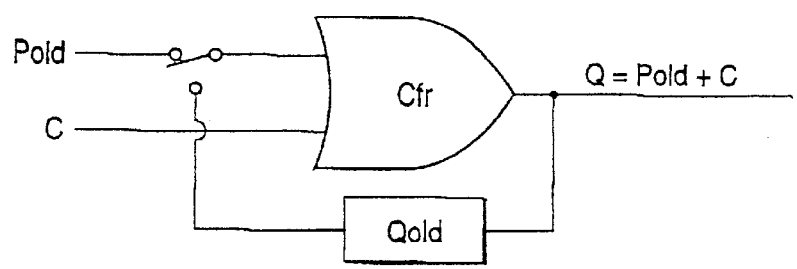
Figure 18B:
Figure 18C:
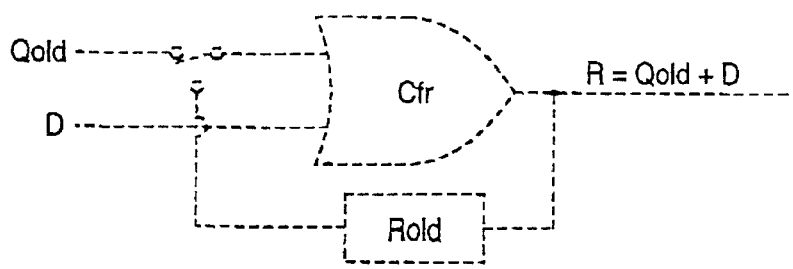

FIGS. 18A, 18B, and 18C represent two motion transitions shown in FIG. 17 using logical operator symbols. That is, when a transition is made to the motion image sequence B during display of the motion image sequence A, the motion image sequences A and B are morphed into the transitional motion image sequence P by the normal morphing processing Co. If a transition is made to the motion image sequence C during display of this transitional motion image sequence P, the aforementioned normal morphing processing Co is interrupted. The old posture data Pold about the motion image sequence P and the motion image sequence C are morphed into the transitional motion image sequence Q by the recursive semifixed morphing processing Cfr.

If a further transition to a motion image sequence D is made during the display of the motion image sequence Q in a manner not shown in FIG. 17, the old posture data Qold about the motion image sequence Q and the motion image sequence D are processed by the recursive semifixed morphing processing Cfr as indicated by the dotted line in FIG. 18C in accordance with the flowchart of FIG. 11. In this way, a new transitional motion image sequence R is created.

Second Embodiment

Figure 19:
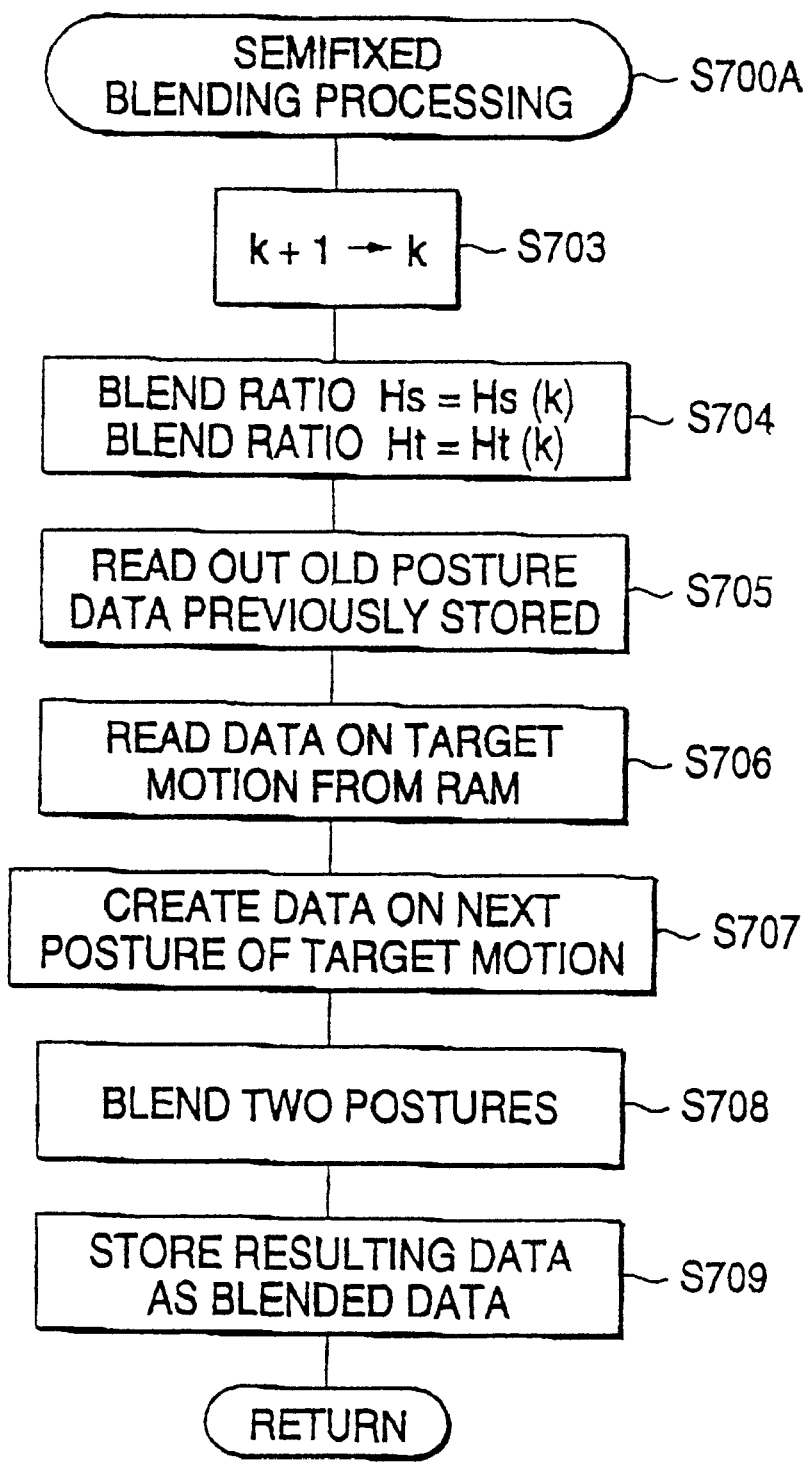
FIG. 19 is a flowchart illustrating other semifixed morphing processing in accordance with the invention.

A similar transitional motion image sequence can be created by semifixed morphing processing S700A illustrated in FIG. 19 instead of the above-described recursive semifixed morphing processing S700. There are differences, however. More specifically, in FIG. 19, if this semifixed morphing processing S700A is repeated, the old posture data stored in the normal morphing processing S600 is read out in step S705 in a manner different from the semifixed morphing processing S700 illustrated in FIG. 15. Moreover, in step S708, old posture data obtained by the present semifixed morphing processing S700A is stored as old posture data derived by the present morphing processing apart from the above-described posture data. The old posture data stored in step S709 can be used when a transition to another motion image sequence is made during execution of the semifixed morphing processing S700.

Also, in step S704, nonlinear functions Hs(k) and Ht(k) (where k is an integer greater than 0) of the morph frame number k are used as the morph ratio for the currently displayed motion image sequence and a target motion image sequence, respectively.

Accordingly, in the present morphing processing, it follows that a sequence of posture data defining initial portions of the transitional motion image sequence is combined with the old posture data stored in the normal morphing processing S600. Therefore, the semifixed blending processing S700A is different from the recursive semifixed blending processing S700, described above, and is non-recursive semifixed blending processing. However, the blend ratio is varied nonlinearly, as in the case of the recursive semifixed blending processing S700.

Figure 20:
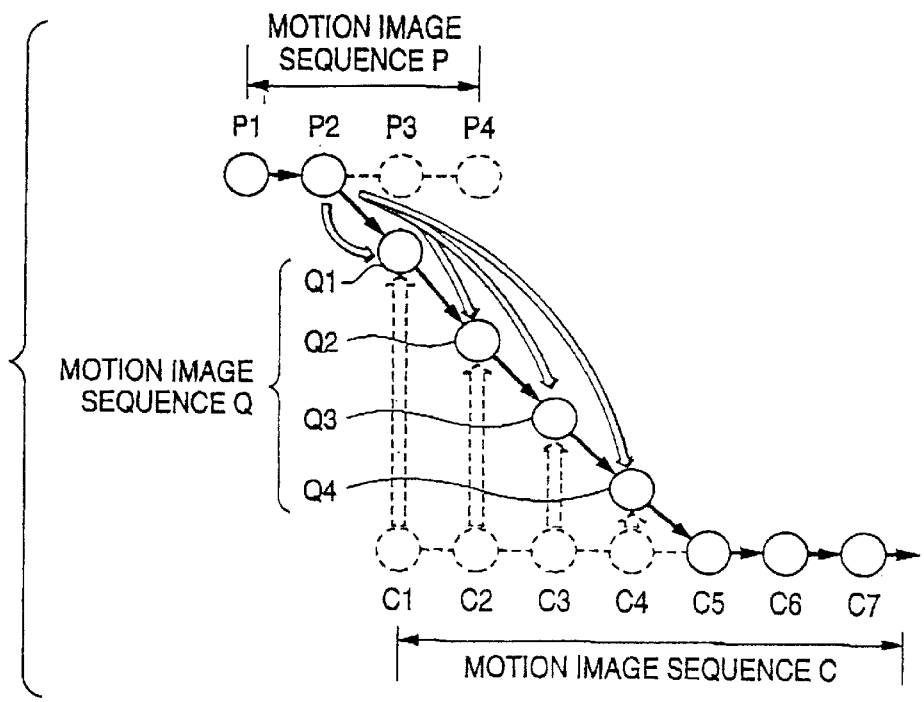
FIG. 20 is a diagram illustrating an example of a transition of motion using the semifixed morphing processing illustrated in FIG. 19.

An example of usage of a morphing process using the semifixed morphing processing S700A is shown in FIG. 20. In this example, when a transition is made from a motion image sequence P to another motion image sequence C, posture data P2 defining a character image displayed last in the motion image sequence P and a sequence of posture data C1, C2, C3, C4 defining initial portions of the motion image sequence C are synthesized into a transitional motion image sequence Q for making a transition to the ensuing portions of the motion image sequence C.

Nonlinear functions Hs(k) and Ht(k) of the morph frame number k are used as the morph ratio for the currently displayed motion image sequence and a target motion image sequence, respectively. The morph ratio Ht(k) for the target motion image sequence is a nonlinear function of the morph frame number k and is so set that it increases at a rate greater than the rate at which the number k increases. Of course, the sum of the two functions is set to 1.

The functions Hs(k) and Ht(k) can be set as given by the following equations (7a) and (7b), for example. Equations (7c) and (7d) are an equation defining the functions used in equations (7a) and (7b) and an equation defining initial values, respectively.

$$Hs(k) = Hs(k-1) \times (1 - H(k)) \quad (7a)$$

$$Ht(k) = 1 - Hs(k) \quad (7b)$$

where $$H(k) = \frac{k}{Rb} \quad (7c)$$

-continued $$Hs(0) = 1 \quad (7d)$$

where Rb is the number of frames necessary for a transition of a motion image sequence and is a natural number.

Specifically, Hs(k), Ht(k), and other factors are given by equations (8a)–(8f).

$$Hs(1) = 1 - \frac{1}{Rb} \quad (8a)$$

$$Ht(1) = \frac{1}{Rb} \quad (8b)$$

$$Hs(2) = \left(1 - \frac{1}{Rb}\right) \times \left(1 - \frac{2}{Rb}\right) \quad (8c)$$

$$Ht(2) = 1 - Hs(2) = \frac{1}{Rb} + \frac{2}{Rb} - \frac{1}{Rb} \times \frac{2}{Rb} \quad (8d)$$

$$Hs(3) = \left(1 - \frac{1}{Rb}\right) \times \left(1 - \frac{2}{Rb}\right) \times \left(1 - \frac{3}{Rb}\right) \quad (8e)$$

$$Ht(3) = 1 - Hs(3) \quad (8f)$$

Note that description of Hs(4), Ht(4), and the following equations is omitted for the sake of simplicity.

Fundamentally, the present semifixed morphing processing S700A produces the same advantages as the above-described semifixed morphing processing S700. However, in the semifixed morphing processing S700 described above, calculation of two functions of morph ratios is unnecessary, unlike the semifixed morphing processing S700A. Furthermore, saving of two kinds of old posture data is unnecessary, unlike the semifixed morphing processing S700A. Hence, the former semifixed morphing processing S700 is easier to carry out.

However, in the present embodiment, relation between the blend ratio and the frame number k can be modified to a desired relation by defining the blend ratio functions Hs(k) and Ht(k) in terms of desired functions.

Third Embodiment

In the first and second embodiments, where a transition is made to a third motion image sequence while a first transitional motion sequence is being displayed to go from a first motion image sequence to a second motion image sequence, the last posture of a character displayed as the first transitional motion image sequence and the third motion image sequence are synthesized to create a second transitional motion image sequence for a transition to the third motion image sequence. As a result, subsequent variations in posture of the character contained in the first motion image sequence are not reflected in the second transitional motion image sequence. In consequence, the second transitional motion image sequence can be prevented from having unnatural postures.

In this motion image display method, however, subsequent posture variations of the character due to the second motion image sequence are not reflected. Depending on the combination of the second and third motion image sequences, it may be desirable to reflect subsequent posture variations of the character due to the second motion image sequence in the second transitional motion image sequence.

In the present embodiment, the second transitional motion image sequence described above is created so that subsequent character posture variations contained in the first motion image sequence are not reflected in the second transitional motion image sequence but subsequent character posture variations contained in the second motion image sequence are reflected in the second transitional motion image sequence.

Figure 21:
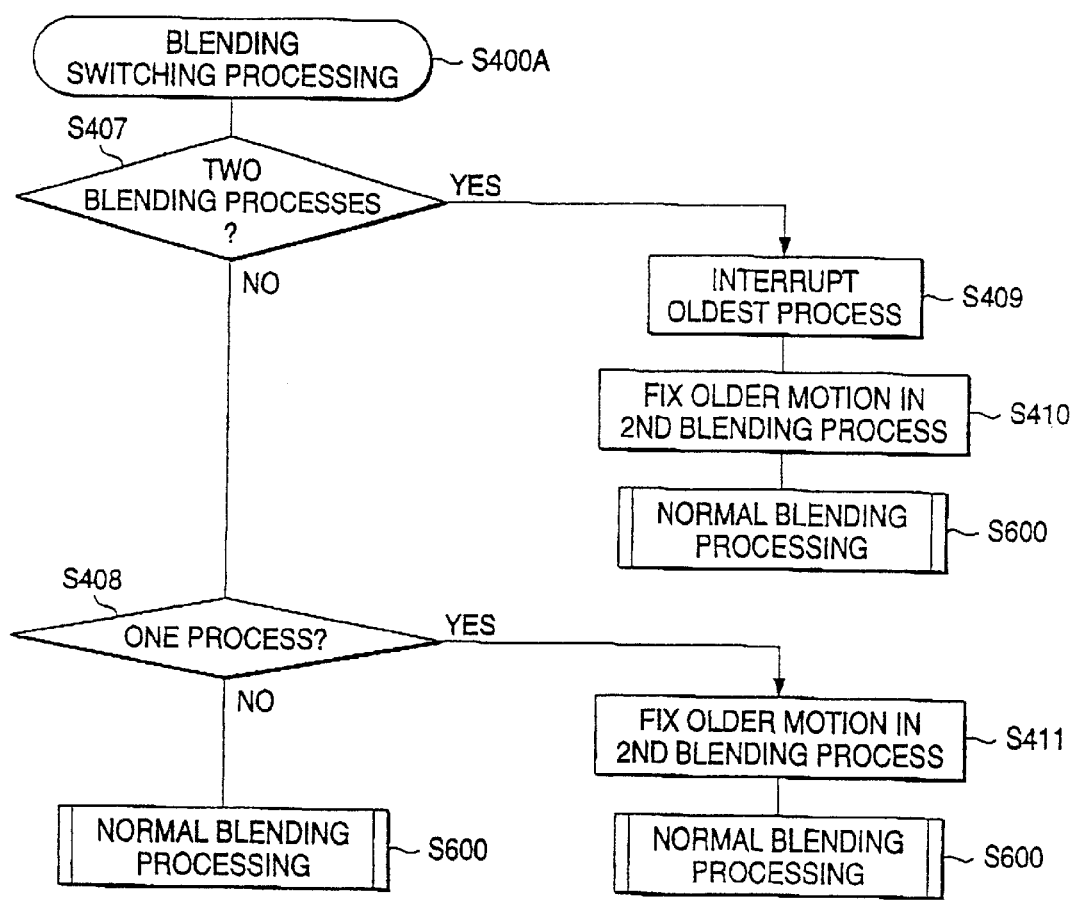
FIG. 21 is a flowchart illustrating other morphing switching processing in accordance with the invention.

FIG. 21 illustrates morphing switching processing S400A used instead of the morphing switching processing S400 of FIG. 11. In the present morphing switching processing, two morphing processes can be carried out simultaneously, unlike the embodiments described thus far. The target motion image-determining processing S401 illustrated in FIG. 12 is omitted in FIG. 21 for simplicity. Furthermore, description of initializing processing S404, S406 and processing S403, S405 regarding motion mode are omitted for simplicity.

In step S407, a decision is made as to whether the number of morphing processes being executed is 2. If the number is not 2, control goes to step S408, where a decision is made as to whether the number of morphing processes being executed is 1. If the result of the decision made in step S408 is that the number of morphing processes being executed is not 1, it follows that no morphing process is being carried out. In this case, the normal morphing processing S600 described previously is carried out, and a motion image sequence for making a transition from the currently displayed motion image sequence to the target motion image sequence is created.

If the result of the decision made in step S408 is that the number of morphing processes being executed is 1, the morphing process being executed is the normal morphing processing S600. Of the two motion image sequences being morphed, the posture of the motion image sequence that has been displayed for the longest time is fixed (step S411). This fixed posture and the other motion image sequence are kept morphed. The morph ratios determined by the original morphing processing are used intact. That is, the normal morphing processing currently executed is continued for the fixed posture. In other words, the normal morphing processing is changed to the non-recursive semifixed morphing processing described in the second embodiment during the execution of the processing. In this way, a modified transitional motion image sequence is created.

Further normal morphing processing S600 is added to morph the transitional motion image sequence obtained by this modified morphing processing and another target motion image sequence into a second transitional motion image sequence.

Figure 22A:
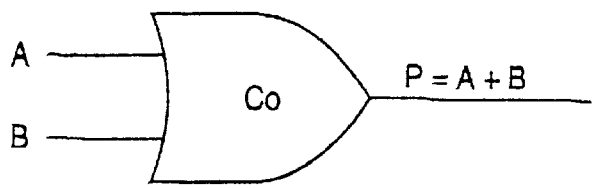
FIGS. 22A, 22B, and 22C are diagrams in which examples of transition of motion are represented in terms of symbols of logical operators.
Figure 22A:
Figure 22B:
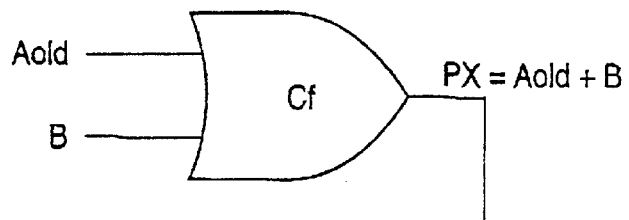
Figure 22B:
Figure 22C:
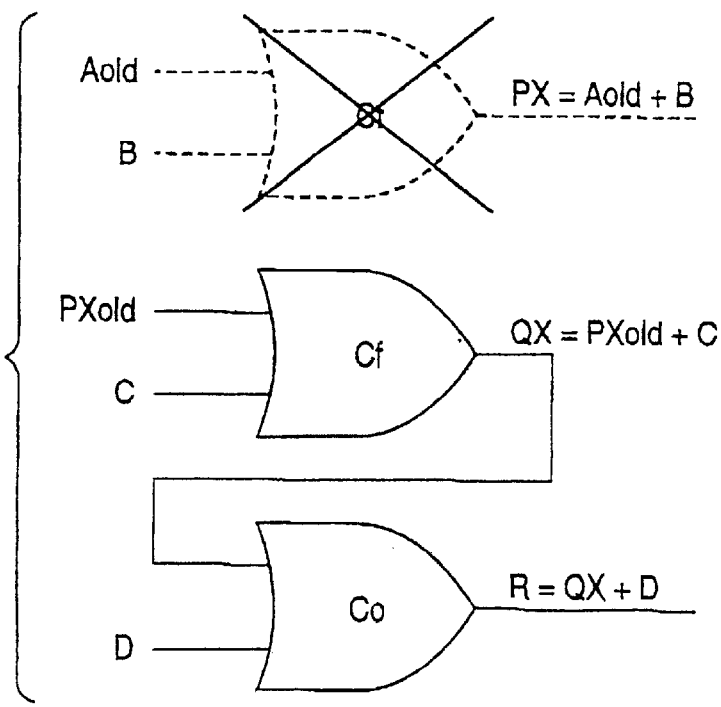

Variations in morphing processing in the present embodiment are shown using logical operator symbols in FIGS. 22A, 22B, and 22C. In these examples, non-recursive semifixed morphing processing is indicated by a logical operator symbol Cf. As shown in FIG. 22A, it is assumed that the normal morphing processing Co is being carried out for a first motion image sequence A and a second motion image sequence B to create a first transitional motion image sequence to make a transition to the second motion image sequence B during display of the first motion image sequence A.

It is assumed that it becomes necessary to make a transition of the motion image sequence and that the morphing switching processing S400A is activated. In step S411, the posture of the first motion image sequence A in the normal morphing processing Co for the first and second motion image sequences A and B is fixed to the posture (old posture data Aold) assumed immediately prior to the transition, as illustrated in FIG. 22B. Non-recursive semifixed morphing processing Cf is continued for this posture (the old posture data Aold) and the motion image sequence B. In this way, a modified transitional motion image sequence PX is obtained. Normal morphing processing Co is added to morph the motion image sequence PX and a third motion image sequence C that is a target motion image sequence. Consequently, a second transitional motion image sequence QX is created.

Eventually, the non-recursive semifixed morphing processing Cf and the normal morphing processing Co are carried out concurrently. The non-recursive semifixed morphing processing Cf is done for the last posture Aold of the first motion image sequence A that is displayed immediately prior to the transition and for the second motion image sequence B. The normal morphing processing Co is performed to morph the motion image sequence PX and the third motion image sequence C described above, the motion image sequence PX being obtained by the non-recursive semifixed morphing processing Cf.

For example, the motion image sequences A, B, and C indicate a running motion, a rest motion, and a returning motion, respectively. If a transition is made to the rest motion image sequence B in response to a "stop" instruction during display of the running motion image sequence A, the motion image sequences A and B are morphed into a first transitional motion image sequence P by the normal morphing processing Co as illustrated in FIG. 22A. This motion image sequence P indicates a motion image sequence obtained when a runner gradually decreases its speed and comes to a stop, for example, in the same way as in the first embodiment.

If a transition is made to a returning motion in response to a "return" instruction during display of the motion image sequence P, the posture of the motion image sequence A is fixed to the posture (posture data Aold) assumed immediately prior to the start of the transition. The fixed posture Aold and stop motion B are morphed into a modified transitional motion image sequence PX by the non-recursive semifixed morphing processing Cf. The modified transitional motion image sequence PX and the returning motion image sequence C are morphed into a motion image sequence QX by normal morphing processing Co for a transition to the motion image sequence C.

The modified transitional motion image sequence PX is used to make a transition from the last posture Aold of the running motion image sequence A to a rest motion image. Subsequent rapid variations in posture contained in the original running motion image sequence A are not reflected. Therefore, the transitional motion image sequence QX obtained by morphing a motion image sequence P and the returning motion image sequence C contains no unnatural postures. Accordingly, the present embodiment is the same as the first embodiment in this respect.

However, in the present embodiment, variations in posture of the motion image sequence B immediately prior to the motion image sequence C and after the start of the transition are reflected in the modified transitional motion image sequence PX and so later posture variations in the motion image sequence B are reflected in the obtained transitional motion image sequence QX. Consequently, the present embodiment is effective where this transitional motion image sequence is desirable.

Referring back to FIG. 21, if the result of the decision made in step S407 is that the number of morphing processes being executed is two, the oldest morphing process of the executed processes is interrupted (step S409). Furthermore, the posture of the older motion image sequence of a pair of motion image sequences morphed by the second morphing processing is fixed, and this morphing processing is modified to non-recursive semifixed morphing processing (step S410). Normal morphing processing S600 is added to create a further transitional motion image sequence by synthesizing the transitional motion image sequence obtained by the non-recursive semifixed morphing processing and another target motion image sequence.

In particular, if the number of morphing processes being conducted is two, they are semifixed morphing processing Cf and the normal morphing processing Co, respectively, as illustrated in FIG. 22B. In step S409, as illustrated in FIG. 22C, the morphing process of these morphing processes which was started earliest (in this example, the non-recursive semifixed morphing processing Cf for morphing the old posture Aold of the first motion image sequence A and the second motion image sequence B) is interrupted.

In step S410, the second morphing process (in this example, the normal morphing processing Co for morphing the transitional motion image sequence PX and the motion image sequence C) is changed to the semifixed morphing processing Cf for morphing the old posture PXold of the transitional motion image sequence PX and the motion image sequence C. The old posture PXold has the same meaning as the old posture Aold of the first motion image sequence described above.

Furthermore, normal morphing processing S600 is added. That is, as illustrated in FIG. 22C, a transitional motion image sequence QX obtained by semifixed morphing processing Cf from old posture PXold of the motion image sequence PX and from the motion image sequence C is combined with another transitional motion image sequence D by normal morphing processing Co.

In this way, the semifixed morphing processing Cf, regarding the last posture data PXold immediately before a further transition of transitional motion sequence PX and regarding the motion sequence C, is carried out simultaneously with the normal morphing processing Co for morphing the target motion sequence QX obtained by the semifixed morph processing Cf and motion sequence D. As a result, a motion sequence R, synthesized from old posture data PXold of motion sequence PX and from motions C and D, is obtained.

As can be seen from the above description, variations in posture of the character in the second image motion sequence occurring after the start of the morphing process are not reflected in the motion image sequence QX for making a transition from the third motion image sequence C to the fourth motion image sequence D. However, variations in posture of the character in the third motion image sequence C occurring after the start of the morphing process are reflected.

Fourth Embodiment

It is assumed in the embodiments described thus far that if a transitional motion image sequence is created by the normal morphing processing at the time of the first motion transition, no unnatural postures appear in the transitional motion image sequence. Specifically, it is assumed that no motion image transition occurs between two motion image sequences involving violent posture variations such as a running motion image sequence and a returning motion image sequence and that the transitional motion image sequence between these two motion image sequences involves mild posture variations such as motion at rest.

The game player depresses the L1 key 32 to give a "run" instruction. A "stop" instruction is given by releasing this key. Similarly, the game player gives a "return" instruction" by depressing the R1 key 33. Accordingly, there is a possibility that the R1 key 33 is depressed before releasing the L1 key 32. Where a transition is made from the running motion image sequence to the returning motion image sequence as described above, the first embodiment of the invention activates the normal morphing processing S600 at step S401 of the morphing switching processing S400 (FIG. 12) because no morphing process is being carried out. Hence, unnatural postures might appear in the transitional motion image sequence.

The present embodiment permits a transition of motion image sequence between such two motion image sequences involving violent posture variations in this way. In particular, combinations of such special motion image sequences are previously registered.

The morphing switching processing S400 of FIG. 12 is modified as follows. When no morphing process is being effected, step S402 makes a decision as to whether the combination of the source motion image sequence and the target motion image sequence is coincident with any one of the combinations of motion image sequences previously registered. If a hit is obtained, the semifixed morphing processing S700 is selected.

The present embodiment can be used in combination with the morphing switching processing S400 described in the third embodiment. Alternatively, it may be used instead of the morphing switching processing employed in the first or third embodiment.

Figure 23A:
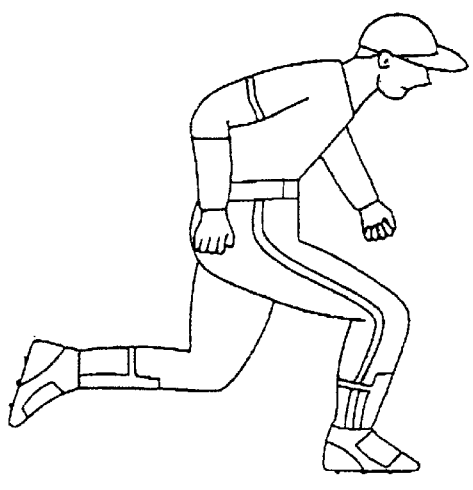
FIGS. 23A, 23B, 23C, and 23D are views showing some examples of motion images obtained in the first embodiment of the present invention.
Figure 23B:
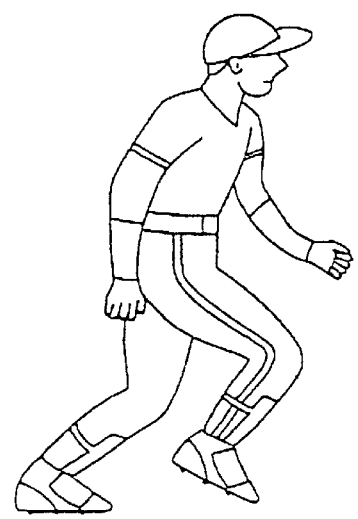
Figure 23C:
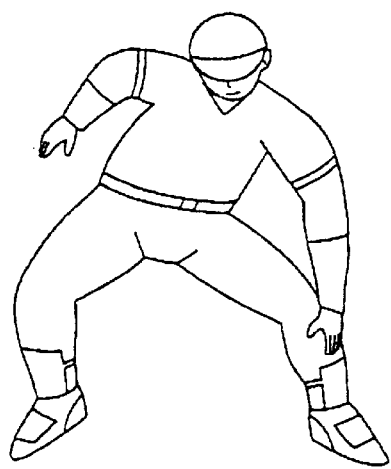
Figure 23D:
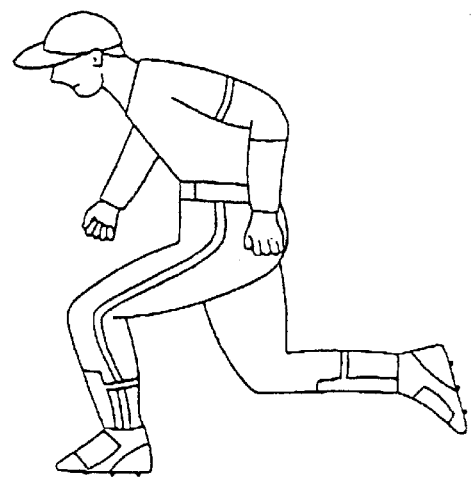

FIGS. 23A, 23B, 23C, and 23D show examples of motion images displayed by the first embodiment. FIG. 23A shows a typical posture of a runner who is running to the right at full speed in response to a "run" instruction given by a game player. FIG. 23B shows a posture of the runner when the "run" instruction is nullified during the running and a transition from the running motion to a stop motion is being made. FIG. 23C shows a posture of the runner when the player gives a "return" instruction before the runner comes to a stop and the runner suddenly attempts to run to the left while a transition is being made from the aforementioned transitional motion to a returning motion. FIG. 23D shows a typical posture of the runner when the transition to the returning motion has finished and he runs to the left at full speed.

As best shown in FIG. 23C, even when a transition is made to a returning motion while a transition is being made from a running motion to a stop motion, the posture can be displayed in a natural way in spite of violent variations in posture of the runner.

As can be understood from the description provided thus far, in any of the embodiments described above, when a transition is made from one motion to another, the transition is made with only slight delay. Furthermore, unnatural postures of the character can be prevented.

It is to be noted that the present invention is not limited to these embodiments and that these embodiments can be appropriately modified within the scope of the present invention.

For example, in the embodiments described thus far, motion data stored in memory includes the relative angles of nodes in a skeleton model. However, relative distances are not contained. The relative distances are determined from data about models of baseball players. Note that the invention is not limited to use of such motion data. For instance, the motion data may contain data about the relative distances of the nodes.

Similarly, posture data used in the embodiments described above contains relative angles but not relative distances. However, data containing relative angles may be used as posture data. In summary, any data can be used as the posture data as long as the data can specify the character's posture or can be used to specify the posture.

Furthermore, in the above embodiments, images of characters representing sports players are created using model data determined for individual sports players. The present invention pertains to a transition of motion image sequence. The invention is not restricted by the manner in which images representing characters making motions are created.

In the embodiments described above, the invention is applied to a baseball game. The invention is also applicable to other sports games such as soccer games and to other kinds of games such as racing games. Additionally, the invention can be applied to still other kinds of games.

The computer forming the game machine described in the above embodiments may have logic circuitry for executing some functions of a game program used in the game machine. Concomitantly, the game program may be modified to vary the method of executing the functions of the used game program.

In the embodiments described above, keypads and a TV set are mounted independent of the game machine. However, the keypads may be integrated with the game machine. Also, the TV set may be integrated with the game machine. Furthermore, all of the keypads and TV set may be integrated with the game machine. In addition, other input devices or display devices may be used. Further, the recording medium used in the game machine may be fixedly mounted in the game machine rather than detachable from the game machine.

The recording medium in accordance with the present invention or the recording medium used in the game machine in accordance with the invention is not limited to a CD-ROM. Any recording medium can be used as long as it can be read by a computer. For example, the medium can be a DVD, a magnetic recording medium, a semiconductor memory, or other optical recording medium.

In the embodiments described above, a domestic game machine is used as a platform. The game machine in accordance with the present invention may be realized on other platform such as a general-purpose computer (e.g., a personal computer) or an arcade game machine. Furthermore, the game machine in accordance with the invention may be accomplished by using a communications terminal such as a cell phone, a mobile communications terminal, or a car navigational system as a platform.

In accordance with the present invention, a transitional motion image sequence is determined from the last displayed posture of a source motion image sequence and from initial portions of a target motion image sequence. Therefore, variations in posture of the source motion image sequence do not affect the transitional motion image sequence. Consequently, even if a transition is made to other motion image sequence that shows a motion exactly opposite to the source motion image sequence, the transition to the target motion image sequence can be accomplished via the smooth transitional motion image sequence.

What is claimed is:

1. A method of displaying a final motion image sequence of a character in a video game according to motion data defining variations in posture of the character in the video game, the method comprising:

responding to an input operation of a game player that is performed during display of a first motion image sequence based on first motion data of the character;

determining, in response to the input operation, second motion data defining a second motion image sequence of the character;

creating a transitional motion image sequence based on a single posture defined in the first motion data and a group of postures defined in the second motion data; and displaying the final motion image sequence comprising a portion of the first motion image sequence, the transitional motion image sequence, and a portion of the second motion image sequence.

2. The method of displaying a final motion image sequence according to claim 1, wherein the transitional motion image sequence creates a gradual transition from the single posture defined in the first motion data to the group of postures defined in that second motion data.

3. The method of displaying a final motion image sequence according to claim 1, wherein the single posture defined in the first motion data is a posture being displayed when the input operation is performed by the game player.

4. The method of displaying a final motion image sequence according to claim 1, wherein the transitional motion image sequence of the character is displayed subsequently to the single posture defined in the first motion data.

5. The method of displaying a final motion image sequence according to claim 1, wherein the second motion image sequence defined by the second motion data comprises an initial posture defined by the second motion data and at least one subsequent posture defined by the second motion data after the initial posture.

6. The method of displaying a final motion image sequence according to claim 1, wherein successive postures of a third motion image sequence defined by third motion data are successively superimposed on a single posture defined by data a last posture of the transitional motion image sequence displayed prior to receiving a second input operation associated with the third motion data; and wherein transitional postures based on the superimposed postures create transitional motion data defining a second transitional motion image sequence.

7. The method of displaying a final motion image sequence according to claim 1, wherein successive postures of the second motion image sequence defined by the second motion data are successively combined with the single posture defined in the first motion data; and wherein transitional postures are placed in a row to create transitional motion data defining the transitional motion image sequence.

8. A method of displaying a final motion image sequence of a character in a video game according to motion data defining a posture of the character at each image frame of the video game, the method comprising:

receiving an input operation of a game player that is performed during display of a first motion image sequence based on first motion data of the character;

determining second motion data defining a second motion image sequence of the character;

creating transitional motion data based on a posture of the character displayed in the image frame when the input operation is performed and on a sequence of image postures defined by the determined second motion data; and displaying the final motion image sequence based on the posture of the character displayed in the image frame when the input operation is performed, the transitional motion data, and the second motion data following the sequence of image postures.

9. A method of displaying a final motion image sequence of a character in a video game according to motion data defining variations in posture of the character in the video game, the method comprising:

responding to an input operation of a game player that is performed during display of a first motion image sequence based on first motion data of the character;

determining, in response to the input operation, second motion data defining a target motion image sequence of the character;

deciding whether the first motion data is motion data created by a combination of plurality of motion data element sets;

if the first motion data is not created by the combination of motion data element sets, creating transitional motion data based on a first posture image sequence defined in the first motion data and a second motion image sequence defined in the second motion data;

if the first motion data is created by the combination of motion data element sets, creating transitional motion data based on a single posture defined in the first motion data and a third motion image sequence defined in the second motion data; and displaying the final motion image sequence based on the transitional motion data and one of the second motion sequence and the third motion sequence following one of the first motion sequence and the single posture defined in the first motion data, respectively.

10. A game machine comprising:

a computer-readable recording medium on which a program for displaying a final motion image sequence of a character in a video game according to motion data defining variations in posture of the character in the video game is recorded;

a computer for reading at least a part of the program from the recording medium and executing it; and a display device on which the video game realized by the program is displayed;

wherein the computer responds to an input operation of a game player during display of a first motion image sequence of the character based on first motion data, determines second motion data defining a second motion image sequence of the character, creates transitional motion data defining a transitional motion image sequence based on a single posture defined in the first motion data and a group of postures defined in the second motion data, and displays the final motion image sequence based on a portion of the first motion image sequence, the transitional motion image sequence, and a portion of the second motion image sequence.

11. The game machine of claim 10, wherein the transitional motion image sequence creates a gradual transition from the single posture defined in the first motion data to the group of postures defined in that second motion data.

12. The game machine of claim 10, wherein the single posture defined in the first motion data is a posture displayed when the input operation is performed by the game player.

13. The game machine of claim 10, wherein the transitional motion image sequence is displayed subsequent to a display of the single posture defined in the first motion data.

14. The game machine of claim 10, wherein the group of postures in the second motion data comprises an initial posture defined by the second motion data and at least one posture of the group of postures defined subsequently to the initial posture.

15. The game machine of claim 10, wherein successive postures of a third image sequence defined in third motion data are successively superimposed on a single posture defined in a last posture of the transitional motion image sequence displayed prior to receiving a second input operation associated with the third motion data; and wherein transitional postures based on the superimposed postures create transitional motion data defining a second transitional motion image sequence.

16. The game machine of claim 10, wherein successive postures of the posture image sequence defined in the second motion data are successively combined with the one posture defined in the first motion data; and wherein transitional postures are placed in a row to create the transitional motion image sequence.

17. A game machine comprising:

a computer-readable recording medium on which a program for displaying a final motion image sequence of a character in a video game according to motion data defining a posture of the character at each image frame of the video game is recorded;

a computer for reading at least a part of the program from the recording medium and executing it; and a display device on which the video game realized by the program is displayed;

wherein the computer responds to an input operation of a game player that is performed during display of a first motion image sequence based on first motion data of the character;

determines second motion data defining a second motion image sequence of the character;

creates transitional motion data based on a posture of the character displayed in the image frame when the input operation is performed and on a sequence of image postures defined by the determined second motion data; and displays the final motion image sequence based on the posture of the character displayed in the image frame when the input operation is performed, the transitional motion data, and the second motion data following the sequence of image postures.

18. A game machine comprising:

a computer-readable recording medium on which a program for displaying a final motion image sequence of a character in a video game according to motion data defining variations in posture of the character in the video game is recorded;

a computer for reading at least a part of the program from the recording medium and executing it; and a display device on which the video game realized by the program is displayed;

wherein the computer responds to an input operation of a game player that is performed during display of a first motion image sequence based on first motion data of the character; determines, in response to the input operation, second motion data defining a target motion image sequence of the character; decides whether the first motion data is motion data created by a combination of plurality of motion data element sets; if the first motion data is not created by the combination of motion data element sets, creates transitional motion data based on a first posture image sequence defined in the first motion data and a second motion image sequence defined in the second motion data; if the first motion data is created by the combination of motion data element sets, creates transitional motion data based on a single posture defined in the first motion data and a third motion image sequence defined in the second motion data; and displays the final motion image sequence based on the transitional motion data and one of the second motion sequence and the third motion sequence following one of the first motion sequence and the single posture defined in the first motion data, respectively.

19. A recording medium for recording a program for displaying a final motion image sequence of a character in a video game according to motion data defining variations in posture of the character in the video game;

the recording medium being readable by a computer;

the program causing the computer to respond to an input operation of a game player that is performed during display of a first motion image sequence based on first motion data of the character; determine, in response to the input operation, second motion data defining a second motion image sequence of the character; create transitional motion data defining a transitional motion image sequence based on a single posture defined in the first motion data and a group of postures defined in the second motion data; and display the final motion image sequence comprising a portion of the first motion image sequence, the transitional motion image sequence, and a portion of the second motion image sequence.

20. The recording medium according to claim 19, wherein the transitional motion image sequence creates a gradual transition from the single posture defined in the first motion data to the group of postures defined in that second motion data.

21. The recording medium according to claim 19, wherein the single posture defined in the first motion data is a posture displayed when the input operation is performed by the game player.

22. The recording medium according to claim 19, wherein the transitional motion image sequence is displayed subsequent to a display of the single posture defined in the first motion data.

23. The recording medium as set forth in claim 19, wherein the group of postures in the second motion data comprises an initial posture defined by the second motion data and at least one posture of the group of postures defined subsequently to the initial posture.

24. A recording medium according to claim 19, wherein successive postures of a third motion image sequence defined in third motion data are successively superimposed on the single posture defined in a last posture of the transitional motion image sequence displayed prior to receiving a second input operation associated with the third motion data; and wherein transitional postures based on the superimposed postures create transitional motion data defining a second transitional motion image sequence.

25. A recording medium according to claim 19, wherein successive postures of the posture image sequence defined in the second motion data are successively combined with the one posture defined in the first motion data; and wherein transitional postures are placed in a row to create the transitional motion image sequence.

26. A recording medium for recording a program for displaying a final motion image sequence of a character in a video game according to motion data defining a posture of the character in the video game at each image frame of the video game;

the recording medium being readable by a computer;

the program causing the computer to respond to an input operation of a game player that is performed during display of a first motion image sequence based on first motion data of the character; determine second motion data defining a second motion image sequence of the character; create transitional motion data based on a posture of the character displayed in the image frame when the input operation is performed and on a sequence of image postures defined by the determined second motion data; and display the final motion image sequence based on the posture of the character displayed in the image frame when the input operation is performed, the transitional motion data, and the second motion data following the sequence of image postures.

27. A recording medium for recording a program for displaying a final motion image sequence of a character in a video game according to motion data defining variations in posture of the character in the video game;

the recording medium being readable by a computer;

the program causing the computer to respond to an input operation of a game player that is performed during display of a first motion image sequence based on first motion data of the character; determines, in response to the input operation, second motion data defining a target motion image sequence of the character; decide whether the first motion data is motion data created by a combination of plurality of motion data element sets; if the first motion data is not created by the combination of motion data element sets, create transitional motion data based on a first motion image sequence defined in the first motion data and a second motion image sequence defined in the second motion data; if the first motion data is created by the combination of motion data element sets, create transitional motion data based on a single posture defined in the first motion data and a third motion image sequence defined in the second motion data; and display the final motion image sequence based on the transitional motion data and one of the second motion sequence and the third motion sequence following one of the first motion sequence and the single posture defined in the first motion data, respectively.

28. A program for use with a computer to display a final motion image sequence of a character in a video game according to motion data defining variations in posture of the character in the video game;

the program causing the computer to respond to an input operation of a game player that is performed during display of a first motion image sequence based on first motion data of the character; determine, in response to the input operation, second motion data defining a second motion image sequence of the character; create transitional motion data defining a transitional motion image sequence based on a single posture defined in the first motion data and a group of postures defined in the second motion data; and display the final motion image sequence comprising a portion of the first motion image sequence, the transitional motion image sequence, and a portion of the second motion image sequence.

29. A program recorded on a recording medium for use with a computer to display a final motion image sequence of a character in a video game according to motion data defining a posture of the character at each image frame of the video game;

the program causing the computer to read at least a part of the program from the recording medium, to respond to an input operation of a game player that is performed during display of a first motion image sequence based on first motion data of the character;

determine second motion data defining a second motion image sequence of the character;

create transitional motion data based on a posture of the character displayed in the image frame when the input operation is performed and on a sequence of image postures defined by the determined second motion data; and display the final motion image sequence based on the posture of the character displayed in the image frame when the input operation is performed, the transitional motion data, and the second motion data following the sequence of image postures.

30. A program for use with a computer to display a final motion image sequence of a character in a video game according to motion data defining variations in posture of the character in the video game;

the program causing the computer to respond to an input operation of a game player that is performed during display of a first motion image sequence based on first motion data of the character; determines, in response to the input operation, second motion data defining a target motion image sequence of the character; decide whether the first motion data is motion data created by a combination of plurality of motion data element sets; if the first motion data is not created by the combination of motion data element sets, create transitional motion data based on a first posture image sequence defined in the first motion data and a second motion image sequence defined in the second motion data; if the first motion data is created by the combination of motion data element sets, create transitional motion data based on a single posture defined in the first motion data and a third motion image sequence defined in the second motion data; and display the final motion image sequence based on the transitional motion data and one of the second motion sequence and the third motion sequence following one of the first motion sequence and the single posture defined in the first motion data, respectively.

31. A method of displaying a final motion image sequence of a character in a video game according to motion data defining variations in posture of the character, the method comprising:

responding to an input operation of a game player performed during display of a source motion image sequence based on source motion data of the character;

determining, in response to the input operation, target motion data defining a target motion image sequence of the character;

determining whether a combination of the source motion image sequence and the target motion image sequence coincides with a previously registered combination;

when the combination coincides with the previously registered combination, creating a transitional motion image sequence based on a single posture defined in the source motion data and a group of postures defined in the target motion data; and displaying the final motion image sequence comprising a portion of the source motion image sequence, the transitional motion image sequence, and a portion of the target motion image sequence.

32. A computer readable medium storing a program for displaying a final motion image sequence of a character in a video game according to motion data defining variations in posture of the character, the medium comprising:

an input source code segment that responds to an input operation of a game player performed during display of a source motion image sequence based on source motion data of the character;

a target motion source code segment that determines, in response to the input operation, target motion data defining a target motion image sequence of the character;

a coincidence source code segment that determines whether a combination of the source motion image sequence and the target motion image sequence coincides with a previously registered combination;

a transitional motion source code segment that, when the combination coincides with the previously registered combination, creates a transitional motion image sequence based on a single posture defined in the source motion data and a group of postures defined in the target motion data; and a display source code segment that displays the final motion image sequence comprising a portion of the source motion image sequence, the transitional motion image sequence, and a portion of the target motion image sequence.

33. A computer program for use with a computer to display a final motion image sequence of a character in a video game according to motion data defining variations in posture of the character, the program causing the computer to:

respond to an input operation of a game player performed during display of a source motion image sequence based on source motion data of the character;

determine, in response to the input operation, target motion data defining a target motion image sequence of the character;

determine whether a combination of the source motion image sequence and the target motion image sequence coincides with a previously registered combination;

when the combination coincides with the previously registered combination, create a transitional motion image sequence based on a single posture defined in the source motion data and a group of postures defined in the target motion data; and display the final motion image sequence comprising a portion of the source motion image sequence, the transitional motion image sequence, and a portion of the target motion image sequence.

34. A game machine comprising:

a computer-readable recording medium on which a program for displaying a final motion image sequence of a character in a video game according to motion data defining variations in posture of the character is recorded;

a computer for reading at least part of the program from the recording medium and executing at least part of the program so that the computer:

responds to an input operation of a game player performed during display of a source motion image sequence based on source motion data of the character;

determines, in response to the input operation, target motion data defining a target motion image sequence of the character;

determines whether a combination of the source motion image sequence and the target motion image sequence coincides with a previously registered combination; and when the combination coincides with the previously registered combination, creates a transitional motion image sequence based on a single posture defined in the source motion data and a group of postures defined in the target motion data; and a display device that displays the source motion image sequence based on source motion data of the character and subsequently displays the final motion image sequence comprising a portion of the source motion image sequence, the transitional motion image sequence, and a portion of the target motion image sequence.

* * * * *